(12) United States Patent
Xu et al.

(10) Patent No.: US 11,783,458 B2
(45) Date of Patent: Oct. 10, 2023

(54) IMAGE PROCESSING METHOD, IMAGE PROCESSING DEVICE, ELECTRONIC DEVICE AND STORAGE MEDIUM

(71) Applicant: Hangzhou Glority Software Limited, Hangzhou (CN)

(72) Inventors: Qingsong Xu, Hangzhou (CN); Qing Li, Hangzhou (CN)

(73) Assignee: Hangzhou Glority Software Limited, Hangzhou (CN)

( * ) Notice: Subject to any disclaimer, the term of this patent is extended or adjusted under 35 U.S.C. 154(b) by 254 days.

(21) Appl. No.: 17/387,952

(22) Filed: Jul. 28, 2021

(65) Prior Publication Data
US 2022/0044367 A1 Feb. 10, 2022

(30) Foreign Application Priority Data

Aug. 5, 2020 (CN) .......................... 202010776656.8

(51) Int. Cl.
| | |
|---|---|
| G06T 5/00 | (2006.01) |
| G06T 7/13 | (2017.01) |
| G06V 30/164 | (2022.01) |
| G06V 30/40 | (2022.01) |
| G06V 30/146 | (2022.01) |
| G06V 30/16 | (2022.01) |
| G06T 3/60 | (2006.01) |

(52) U.S. Cl.
CPC ............... *G06T 5/006* (2013.01); *G06T 3/60* (2013.01); *G06T 7/13* (2017.01); *G06V 30/1478* (2022.01); *G06V 30/164* (2022.01); *G06V 30/1607* (2022.01); *G06V 30/40* (2022.01); *G06T 2207/10004* (2013.01); *G06T 2207/20008* (2013.01); *G06T 2207/20012* (2013.01); *G06T 2207/30176* (2013.01)

(58) Field of Classification Search
None
See application file for complete search history.

(56) References Cited

U.S. PATENT DOCUMENTS 8,897,600 B1 * 11/2014 Ma .......................... G06T 5/006
382/290
9,582,727 B2 * 2/2017 Abdollahian ...... G06V 30/1478
(Continued)

*Primary Examiner* — Emily C Terrell
*Assistant Examiner* — Nathan J Bloom
(74) *Attorney, Agent, or Firm* — JCIP GLOBAL INC.

(57) ABSTRACT

An image processing method, an image processing device, an electronic device, and a storage medium are provided. The image processing method includes: obtaining an input image, wherein the input image includes M character rows; performing global correction processing on the input image to obtain an intermediate corrected image; determining the M character row lower boundaries; determining the relative offset of all pixels in the intermediate corrected image according to the M character row lower boundaries, the first image boundary and the second image boundary of the intermediate corrected image; determining the local adjustment offset of all pixels in the intermediate corrected image according to the relative offsets of all pixels in the intermediate corrected image; and performing local adjustment on the intermediate corrected image according to the local adjustment offsets of all pixels in the intermediate corrected image to obtain the target corrected image.

25 Claims, 28 Drawing Sheets

(56) References Cited

U.S. PATENT DOCUMENTS

| | | | | |
|---|---|---|---|---|
| 2014/0362248 | A1* | 12/2014 | Ishida | H04N 1/00251 |
| | | | | 348/222.1 |
| 2016/0125613 | A1* | 5/2016 | Shustorovich | G06V 10/242 |
| | | | | 382/140 |
| 2016/0210507 | A1* | 7/2016 | Abdollahian | G06V 30/224 |
| 2020/0110959 | A1* | 4/2020 | Slattery | G06T 3/608 |
| 2020/0394763 | A1* | 12/2020 | Ma | G06T 5/002 |
| 2022/0005163 | A1* | 1/2022 | Xu | G06V 30/18076 |

* cited by examiner

IMAGE PROCESSING METHOD, IMAGE PROCESSING DEVICE, ELECTRONIC DEVICE AND STORAGE MEDIUM

CROSS-REFERENCE TO RELATED APPLICATION

This application claims the priority benefit of China application serial no. 202010776656.8, filed on Aug. 5, 2020. The entirety of the above-mentioned patent application is hereby incorporated by reference herein and made a part of this specification.

BACKGROUND

Field of the Disclosure

The embodiments of the present disclosure relate to an image processing method, an image processing device, an electronic device, and a non-transitory computer readable storage medium.

Description of Related Art

With the development of digital technology, paper files can be scanned or photographed to be converted into electronic text images, which can be easily stored and transmitted through the Internet. In addition, the text image can be recognized by text recognition technology to obtain the information recorded in the text image. However, in the process of converting a paper file into a text image, the text image may be inclined, etc., and the inclination will have an adverse effect on the analysis (for example, text recognition, etc.) of the text image. Therefore, it is necessary to correct the text image so that the information recorded in the text image can be stored and transmitted more accurately.

SUMMARY OF THE DISCLOSURE

At least one embodiment of the present disclosure provides an image processing method, including: obtaining an input image, wherein the input image includes M character rows, and each character row in the M character rows includes at least one character, and the M character rows are arranged along the first direction, wherein M is a positive integer; performing global correction processing on the input image to obtain an intermediate corrected image; performing local adjustment on the intermediate corrected image to obtain a target corrected image. The step of performing local adjustments on the intermediate corrected image to obtain the target corrected image includes: determining the M character row lower boundaries corresponding to the M character rows according to the intermediate corrected image; determining the local adjustment reference line, a first image boundary and a second image boundary of the intermediate corrected image based on the intermediate corrected image, wherein the first image boundary and the second image boundary are the two boundaries of the intermediate corrected image in the first direction; determining the relative offset of all pixels in the intermediate corrected image according to the first image boundary, the second image boundary, and the M character row lower boundaries; setting the local adjustment offset of all pixels on the local adjustment reference line as the predetermined value; determining the local adjustment offset of all pixels outside the local adjustment reference line in the intermediate corrected image according to the local adjustment offset of all pixels on the local adjustment reference line and the relative offset corresponding to all pixels in the intermediate corrected image; performing local adjustment to the intermediate corrected image to obtain the target corrected image according to the local adjustment offset of all pixels outside the local adjustment reference line in the intermediate corrected image and the local adjustment offset of all pixels on the local adjustment reference line.

At least one embodiment of the present disclosure provides an image processing device, including: an acquisition module for obtaining an input image, wherein the input image includes M character rows, and each character row in the M character rows includes at least one character, the M character rows are arranged along the first direction, and M is a positive integer; a global correction module configured to perform global correction processing on the input image to obtain an intermediate corrected image; a local adjustment module configured to perform local adjustment on the intermediate corrected image to obtain the target corrected image; wherein the operation of the local adjustment module performing the local adjustment on the intermediate corrected image to obtain the target corrected image includes the following operation: determining the M character row lower boundaries corresponding to the M character rows according to the intermediate corrected image; determining the local adjustment reference line, a first image boundary and a second image boundary of the intermediate corrected image based on the intermediate corrected image, wherein the first image boundary and the second image boundary are the two boundaries of the intermediate corrected image in the first direction; determining the relative offset of all pixels in the intermediate corrected image according to the first image boundary, the second image boundary, and the M character row lower boundaries; setting the local adjustment offset of all pixels on the local adjustment reference line as the predetermined value; determining the local adjustment offset of all pixels outside the local adjustment reference line in the intermediate corrected image according to the local adjustment offset of all pixels on the local adjustment reference line and the relative offset corresponding to all pixels in the intermediate corrected image; performing local adjustment on the intermediate corrected image to obtain the target corrected image according to the local adjustment offset of all pixels outside the local adjustment reference line in the intermediate corrected image and the local adjustment offset of all pixels on the local adjustment reference line.

At least one embodiment of the present disclosure provides an electronic device, including: a memory for non-transitory storage of computer-readable instructions; a processor for running the computer-readable instructions, wherein the image processing method as described in any embodiment of the present disclosure is implemented when the computer-readable instructions are executed by the processor.

At least one embodiment of the present disclosure provides a non-transitory computer readable storage medium, wherein the non-transitory computer readable storage medium stores computer-readable instructions, wherein the image processing method as described in any embodiment of the present disclosure is implemented when the computer-readable instructions are executed by the processor.

BRIEF DESCRIPTION OF THE DRAWINGS

In order to explain the technical solutions of the embodiments of the present disclosure more clearly, the drawings of the embodiments will be briefly introduced below. Obviously, the drawings in the following description only relate to some embodiments of the present disclosure, rather than limit the present disclosure.

FIG. 4A is a schematic view of an intermediate corrected image provided by some embodiments of the present disclosure.

FIG. 9A is a schematic view of a binarized image of an input image provided by some embodiments of the present disclosure.

FIG. 11A is a schematic view of a target corrected image provided by some embodiments of the present disclosure.

DESCRIPTION OF EMBODIMENTS

Figure 1:
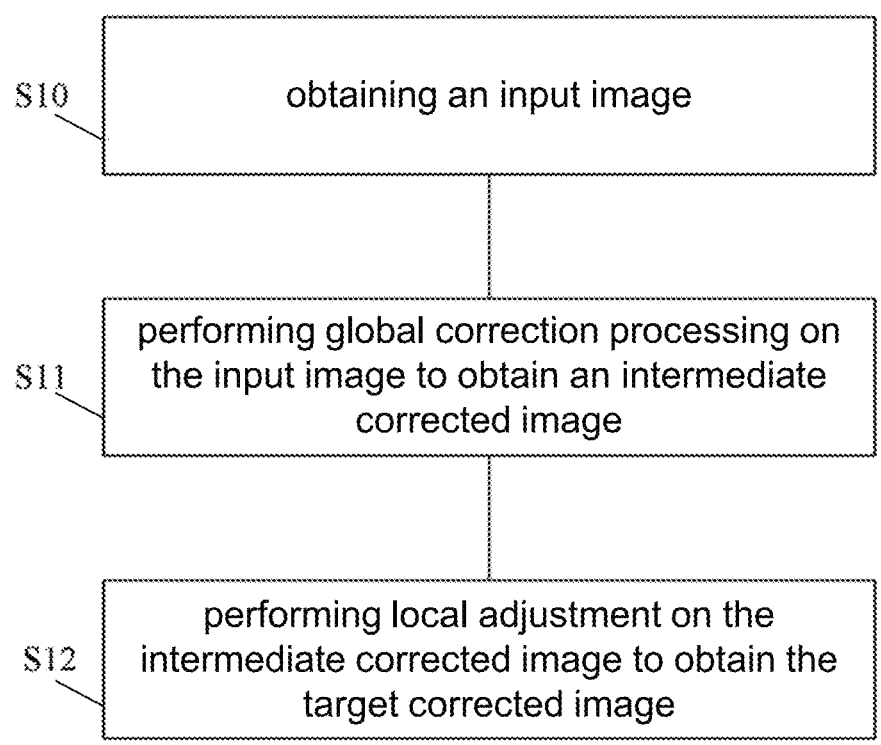
FIG. 1 is a schematic flowchart of an image processing method provided by at least one embodiment of the present disclosure.

In order to make the objectives, technical solutions, and advantages of the embodiments of the present disclosure clearer, the technical solutions of the embodiments of the present disclosure will be described clearly and thoroughly with reference to the accompanying drawings of the embodiments of the present disclosure. Obviously, the described embodiments are part of the embodiments of the present disclosure, rather than all of the embodiments. Based on the described embodiments of the present disclosure, all other embodiments obtained by those of ordinary skill in the art without inventive effort fall within the protection scope of the present disclosure.

Unless otherwise defined, the technical terms or scientific terms used in the present disclosure shall have the common meanings comprehensible by those with ordinary skills in the field to which this disclosure belongs. The "first", "second" and similar words used in the present disclosure do not indicate any order, quantity or importance, but are only used to distinguish different components. The terms "include" or "comprises" and other similar words mean that the element or item appearing before the word covers the element or item listed after the word and their equivalents, but does not exclude other elements or items. Terms such as "connected" or "linked" and similar words are not limited to physical or mechanical connections, but may include electrical connections, regardless direct or indirect. Terms "Up", "Down", "Left", "Right", etc. are only used to indicate the relative position relationship. When the absolute position of the described object changes, the relative position relationship may also change accordingly.

In order to keep the following description of the embodiments of the present disclosure clear and concise, the present disclosure omits detailed descriptions of some known functions and known components.

At least one embodiment of the present disclosure provides an image processing method, an image processing device, an electronic device, and a non-transitory computer readable storage medium. The image processing method includes: obtaining an input image, wherein the input image includes M character rows, each character row in the M character rows includes at least one character, the M character rows are arranged in a first direction, and M is a positive integer; performing global correction processing on the input image to obtain an intermediate corrected image; making local adjustments on the intermediate corrected image to obtain the target corrected image.

The step of performing local adjustments on the intermediate corrected image to obtain the target corrected image includes: determining the M character row lower boundaries corresponding to the M character rows according to the intermediate corrected image; determining the local adjustment reference line, a first image boundary and a second image boundary of the intermediate corrected image based on the intermediate corrected image, wherein the first image boundary and the second image boundary are the two boundaries of the intermediate corrected image in the first direction; determining the relative offset of all pixels in the intermediate corrected image according to the first image boundary, the second image boundary, and the M character row lower boundaries; setting the local adjustment offset of all pixels on the local adjustment reference line as the predetermined value; determining the local adjustment offset of all pixels outside the local adjustment reference line in the intermediate corrected image according to the local adjustment offset of all pixels on the local adjustment reference line and the relative offset corresponding to all pixels in the intermediate corrected image; performing local adjustment on the intermediate corrected image to obtain the target corrected image according to the local adjustment offset of all pixels outside the local adjustment reference line in the intermediate corrected image and the local adjustment offset of all pixels on the local adjustment reference line.

In the image processing method provided by the embodiment of the present disclosure, global correction is performed first on the input image to obtain an intermediate corrected image, and then local adjustment is performed on the intermediate corrected image to determine the target corrected image. The local adjustment can be performed to make some supplementary correction directed at some details that are neglected in the global correction process. In this way, it is possible to avoid that some unsmooth areas generated due to the details neglected in the global correction process still exist in some details of the images subjected to the global correction process, and avoid that the detailed parts are not corrected. Therefore, local adjustments are required to further process the images in order to improve the accuracy of the correction.

The image processing method provided by the embodiment of the present disclosure may be applied to the image processing device provided by the embodiment of the present disclosure, and the image processing device may be configured on an electronic device. The electronic device may be a personal computer, a mobile terminal, etc., and the mobile terminal may be a hardware device such as a mobile phone or a tablet computer.

The embodiments of the present disclosure will be described in detail below with reference to the accompanying drawings, but the present disclosure is not limited to these specific embodiments.

Figure 2:
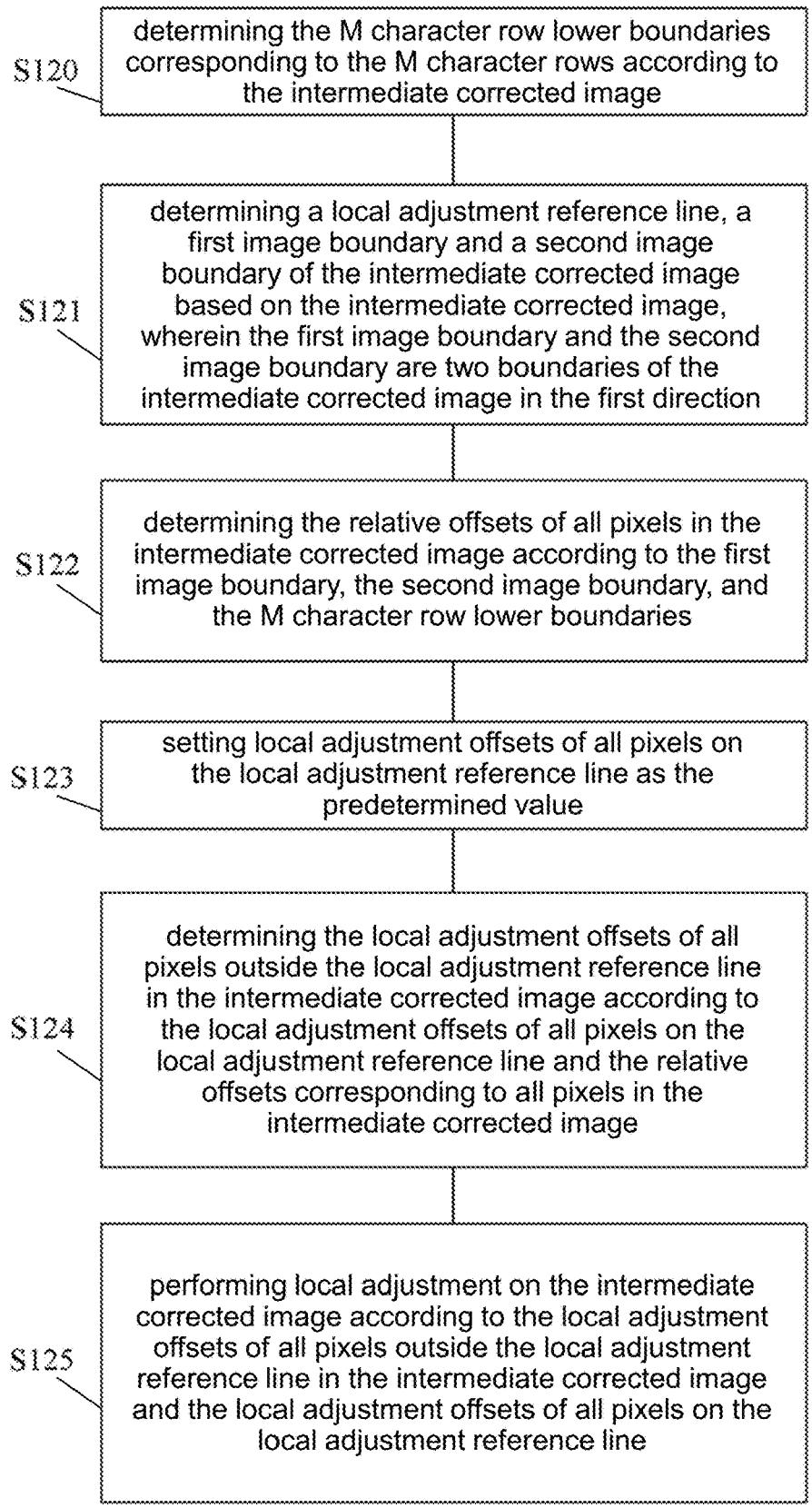
FIG. 2 is a schematic flowchart of step S12 in the image processing method shown in FIG. 1.
Figure 3:
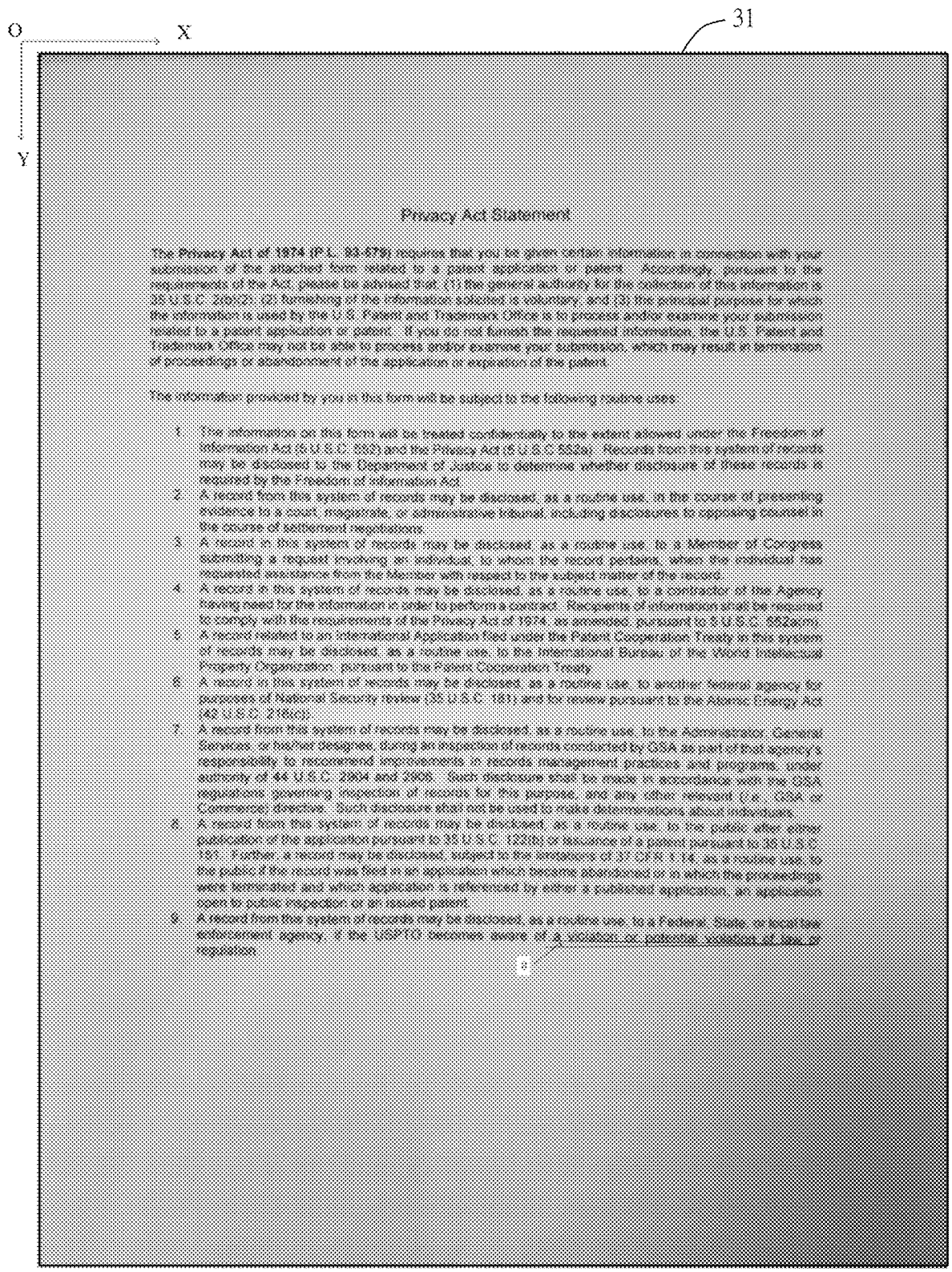
FIG. 3 is a schematic view of an input image provided by at least one embodiment of the present disclosure.

FIG. 1 is a schematic flowchart of an image processing method provided by at least one embodiment of the present disclosure. FIG. 2 is a schematic flowchart of step S12 in the image processing method shown in FIG. 1. FIG. 3 is a schematic view of an input image provided by at least one embodiment of the present disclosure.

As shown in FIG. 1, the image processing method provided by an embodiment of the present disclosure includes steps S10 to S12. First, in step S10, an input image is obtained; in step S11, global correction processing is performed on the input image to obtain an intermediate corrected image; in step S12, local adjustment is performed on the intermediate corrected image to obtain the target corrected image.

For example, in step S10, the input image includes M character rows, each character row in the M character rows includes at least one character, and M is a positive integer. The M character rows are arranged along the first direction, the characters in each character row may be arranged along the second direction, and the first direction and the second direction may be substantially perpendicular to each other. For example, the first direction may be a vertical direction, and correspondingly, the second direction may be a horizontal direction; or, the first direction may be a horizontal direction, and the second direction may be a vertical direction. For example, as shown in FIG. 3, in some embodiments, the first direction may be the Y-axis direction, that is, the vertical direction, and the second direction may be the X-axis direction, that is, the horizontal direction.

As shown in FIG. 3, M character rows can include the character "Privacy", the character "Act", the character "Statement", the character "The", the character "1974", the character "requires", the character "that", and the character "you", etc., wherein the character "Privacy", the character "Act", and the character "Statement" are arranged in the same character row (for example, the first line), and the character "The", the character "1974", the character "requires", the character "that", and the character "you", etc. are arranged in the same character row (for example, the second line).

For example, each character can be numbers, Chinese characters (Chinese text, Chinese words, etc.), foreign characters (for example, foreign letters, foreign words, etc.), special characters (for example, percent sign "%"), punctuation marks, and graphics, etc.

For example, the input image is an image obtained by a user taking a photo of an object, the object includes characters, and the object may be, for example, business cards, test papers, documents, invoices, and so on. As shown in FIG. 3, in some embodiments, the input image 31 may be an image obtained by photographing a document.

For example, in the input image, each character may be inclined with respect to the horizontal direction or the vertical direction. As shown in FIG. 3, a second coordinate system OXY is determined with the upper left corner of the input image 31 as the coordinate origin, the X-axis extends to the right and the Y-axis extends downwards. For example, the horizontal direction can be the X-axis direction, and the vertical direction can be the Y-axis direction. The characters "violation", "or", "potential", "law", etc. are arranged in a line, and the angle between the character row and the horizontal direction (that is, the X-axis direction) is θ, that is, the angle at which the character row is inclined with respect to the horizontal direction is θ. It should be noted that in FIG. 3, in order to clearly show the second coordinate system OXY, the origin of the second coordinate system OXY and the pixel in the upper left corner of the input image 31 do not overlap each other. However, those skilled in the art should know that the origin of the coordinate system can coincide with the pixel in the upper left corner of the input image 31. The present disclosure is not limited thereto. In other embodiments, the origin of the second coordinate system OXY may also coincide with the pixel at the center of the input image 31, or may coincide with the pixel at other corners of the input image 31.

It should be noted that the second coordinate system OXY can also be applied to various images such as the intermediate corrected image and target corrected image described in the present disclosure, that is, the first coordinate system and the second coordinate system OXY determined based on the intermediate corrected image can be the same coordinate system, but the present disclosure is not limited thereto. The first coordinate system and the second coordinate system OXY may also be two different coordinate systems. The first coordinate system and the second coordinate system OXY may both be rectangular coordinate systems. In the description of the embodiments of the present disclosure, the first coordinate system and the second coordinate system OXY are exemplified as the same coordinate system for description.

For example, the shape of the input image can be a rectangle or the like. The shape and size of the input image can be set by the user according to the actual situation.

For example, the input image can be an image taken by a digital camera or a mobile phone, and the input image can be a grayscale image or a color image. For example, the input image may be an original image directly captured by an image capturing device, or an image obtained by preprocessing the original image. For example, in order to prevent the data quality and data imbalance of the input image from affecting the image processing, before the input image is processed, the image processing method may further include preprocessing the input image. The step of preprocessing can eliminate irrelevant information or noise information in the input image, so as to better process the input image.

Figure 4A:
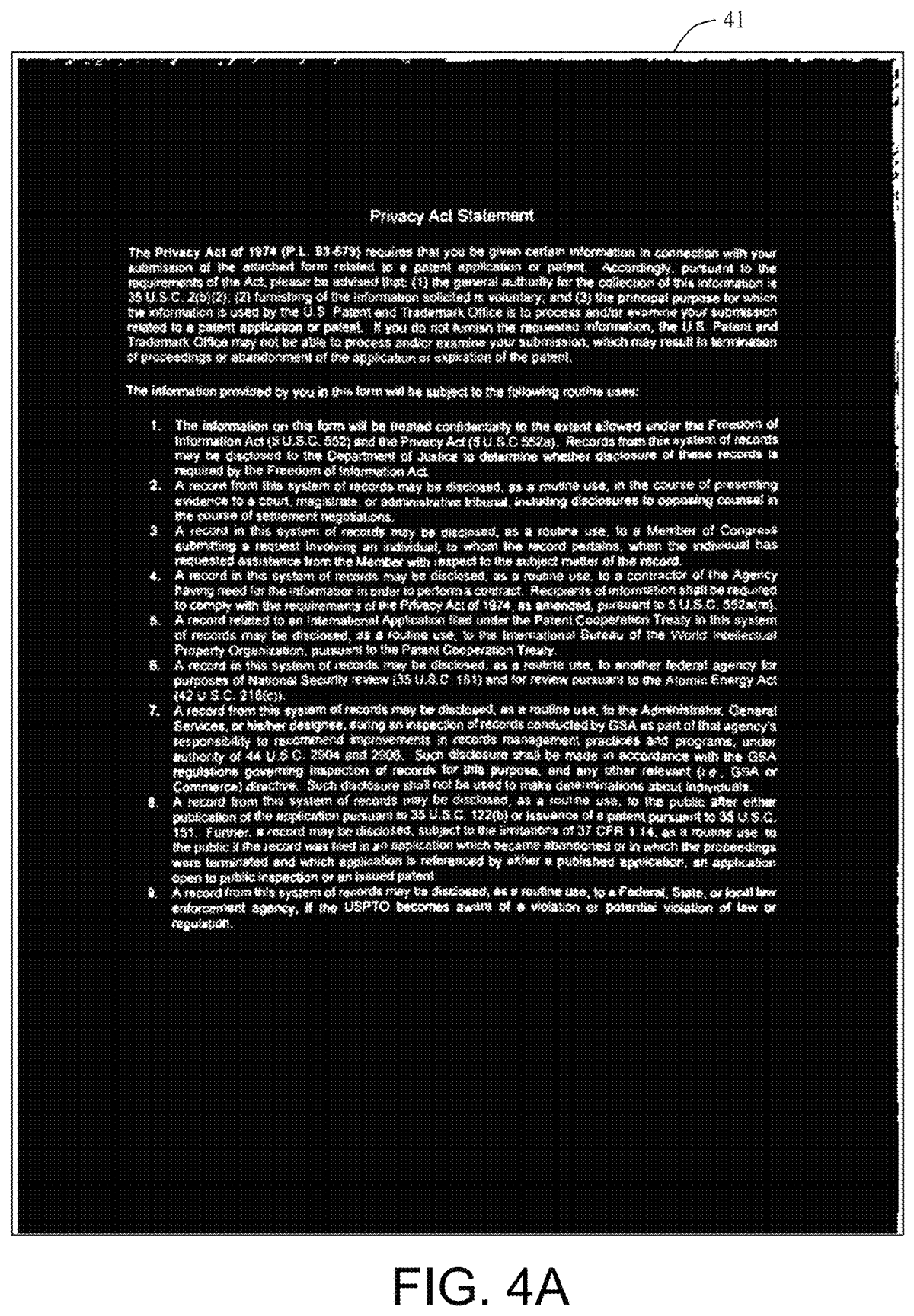
Figure 4B:
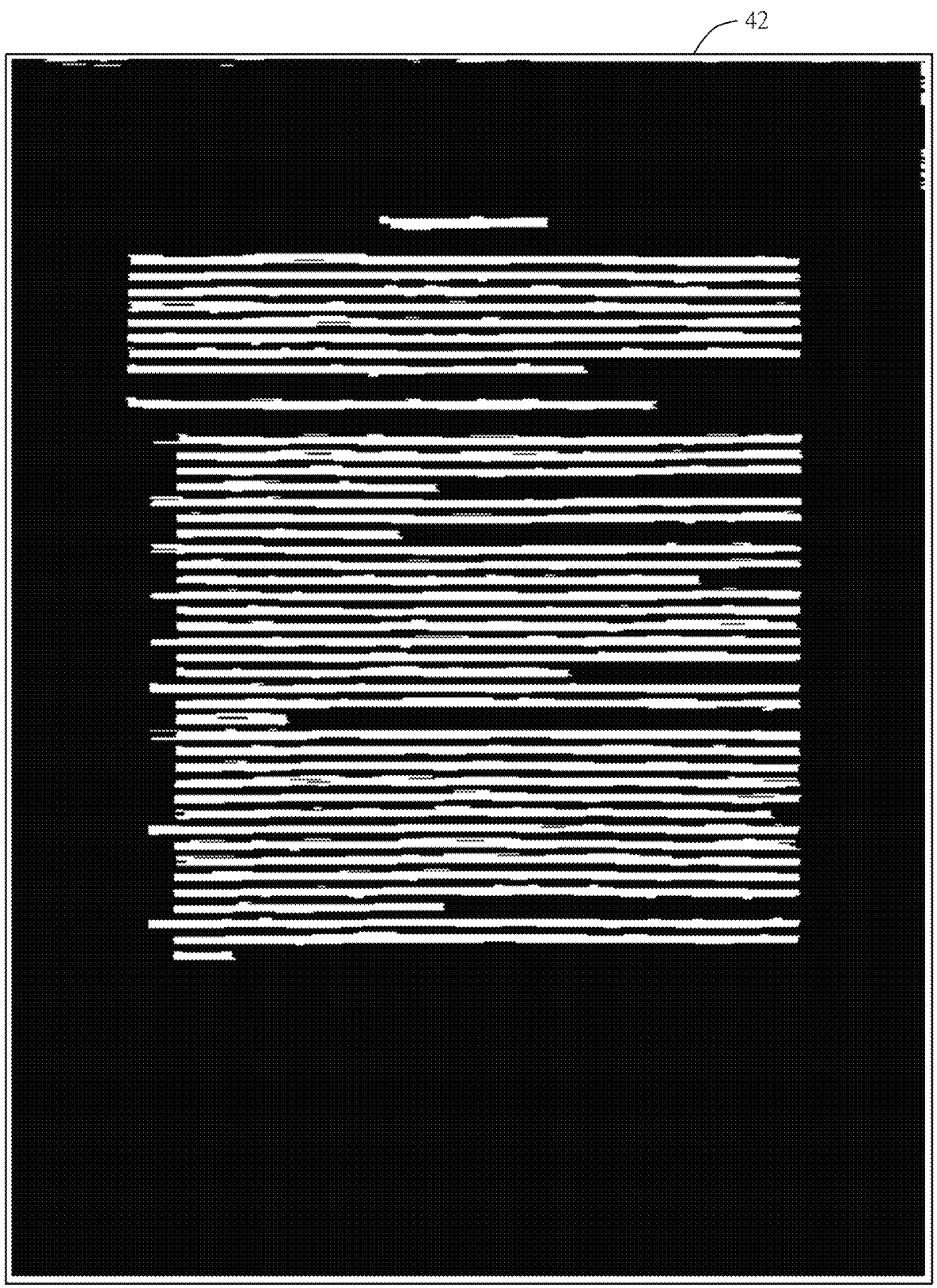
FIG. 4B is a schematic view of a connected image of intermediate characters provided by some embodiments of the present disclosure.

FIG. 4A is a schematic view of an intermediate corrected image provided by some embodiments of the present disclosure. FIG. 4B is a schematic view of a connected image of intermediate characters provided by some embodiments of the present disclosure.

For example, as shown in FIG. 2, in some embodiments, step S12 may include steps S120 to S125.

In the image processing method provided by the embodiment of the present disclosure, by performing local adjustment on the intermediate corrected image that is subjected to global correction, the deformation of characters (for example, text) can be reduced, and the correction effect can be improved.

For example, as shown in FIG. 2, step S120: The M character row lower boundaries corresponding to the M character rows is determined according to the intermediate corrected image.

For example, step S120 may include: performing character connection processing on the intermediate corrected image to obtain an intermediate character connected image, wherein the intermediate character connected image includes M intermediate character connected areas corresponding to the M character rows; determining the M character row lower boundaries corresponding to the M character rows according to the M intermediate character connected areas and the intermediate corrected image.

For example, as shown in FIG. 4A, in some embodiments, the intermediate corrected image 41 may be a binarized image. In the intermediate corrected image 41, the pixel corresponding to the character is represented by white, and the pixel corresponding to the background is represented by black, that is, the pixel corresponding to the character has a grayscale value of 255, and the pixel corresponding to the background has a grayscale value of 0.

For example, in step S120, when the intermediate corrected image can be a binarized image, the intermediate corrected image can be subjected to character connection processing directly based on mathematical morphology operation, so as to obtain an intermediate character connected image including the M intermediate character connected areas. The intermediate character connected image 42 shown in FIG. 4B is an image obtained by performing character connection processing on the intermediate corrected image 41 shown in FIG. 4A.

It should be noted that the present disclosure does not limit that the intermediate corrected image is a binarized image. In other embodiments, the intermediate corrected image may also be a grayscale image or a color image. Under the circumstances, in step S120, character connection processing is performed on the intermediate corrected image to obtain the intermediate character connected image, which may include: firstly, the intermediate corrected image is binarized to obtain a binarized image of the intermediate corrected image, and then character connection processing is performed on the binarized image of the intermediate corrected image to obtain an intermediate character connected image.

For example, as shown in the intermediate character connected image 42 in FIG. 4B, the white area is the intermediate character connected area. For example, each intermediate character connected area may include multiple characters in the same line, and M character rows correspond to the M intermediate character connected areas one-to-one, that is, each character row only corresponds to one intermediate character connected area.

For example, the character connection processing can perform the expansion operation processing on the intermediate corrected image, thereby connecting the characters spaced apart into a straight line, so as to facilitate the subsequent linear detection. In addition, the character connection processing can also be performed in other ways, such as using neural network models like Mask-RCNN.

For example, as shown in the intermediate character connected image 42 in FIG. 4B, the M intermediate character connected areas are arranged along the first direction (i.e., the Y-axis direction of the second coordinate system OXY shown in FIG. 3).

For example, in step S120, based on the M intermediate character connected areas, the lower boundary of the area corresponding to the M intermediate character connected areas can be determined. Based on the intermediate corrected image, the approximate range where each character row is located can be determined. Based on the approximate range where the lower boundary of area and each character row are located, the character row lower boundary corresponding to each character row can be determined.

Figure 4C:
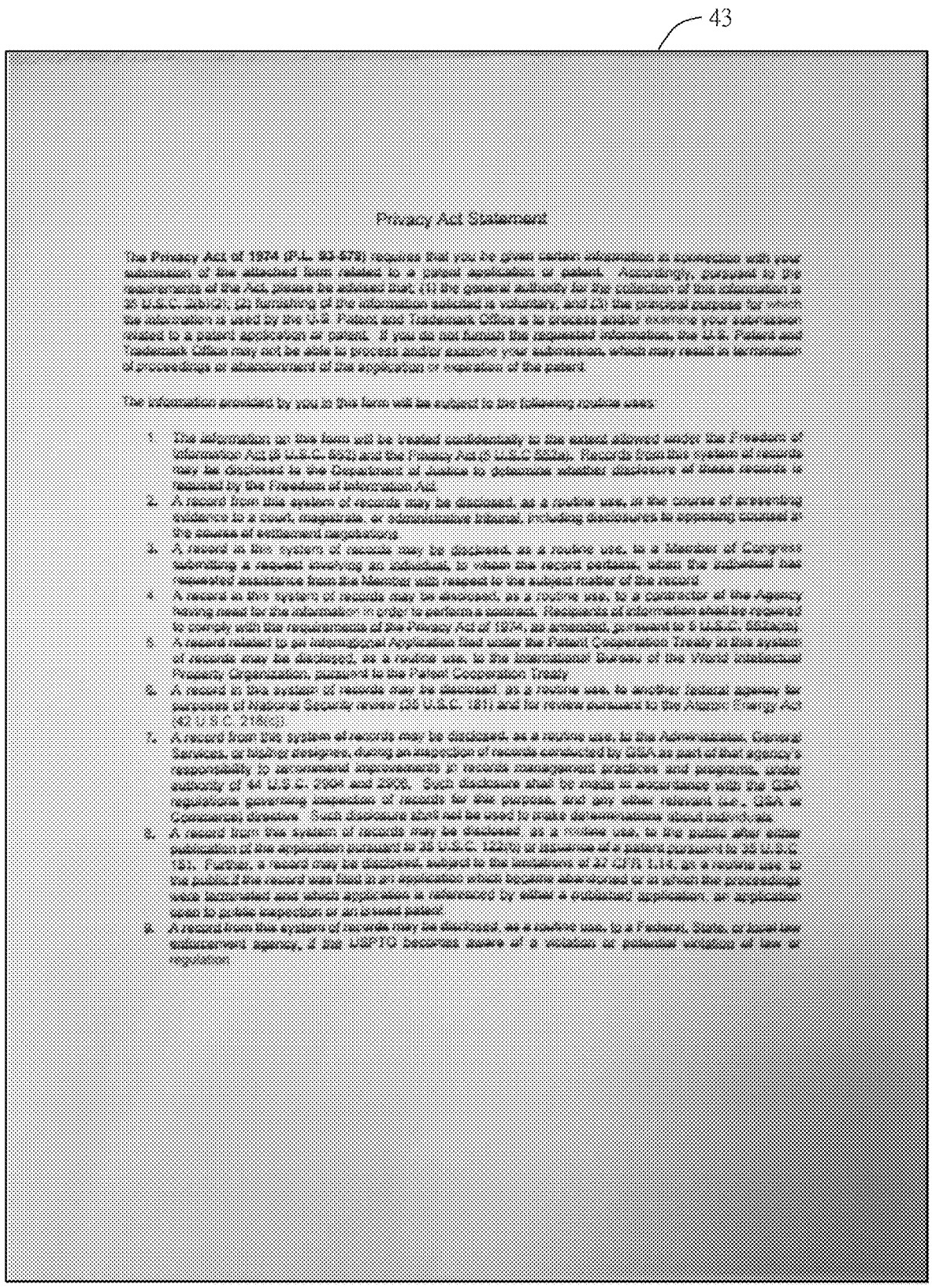
FIG. 4C is a schematic view of an intermediate corrected image including a plurality of pixels corresponding to a character row lower boundary provided by some embodiments of the present disclosure.
Figure 4D:
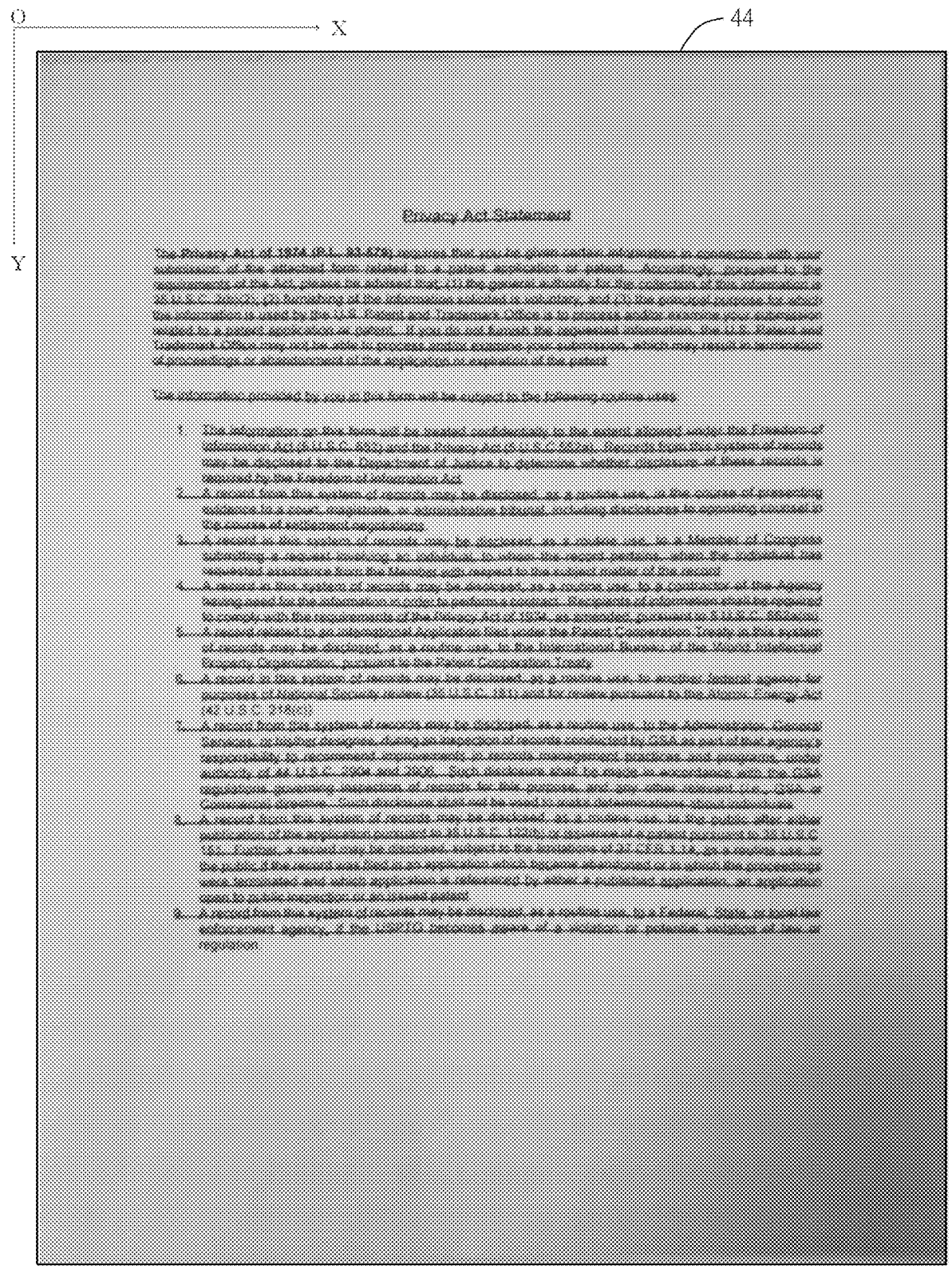
FIG. 4D is a schematic view of an intermediate corrected image including a character row lower boundary provided by some embodiments of the present disclosure.

FIG. 4C is a schematic view of an intermediate corrected image including a plurality of pixels corresponding to a character row lower boundary provided by some embodiments of the present disclosure. FIG. 4D is a schematic view of an intermediate corrected image including a character row lower boundary provided by some embodiments of the present disclosure.

For example, in step S120, in some embodiments, the step of determining the M character row lower boundaries corresponding to the M character rows according to the M intermediate character connected areas and the intermediate corrected image includes: determining the lower boundary of the M areas corresponding to the M intermediate character connected areas one-to-one; performing a boundary fitting process on the M character rows to obtain the M character row lower boundaries according to the lower boundary of the M areas and the intermediate corrected image.

For example, the M character rows include the i1-th character row, the i1-th character row corresponds to the intermediate character connected area corresponding to the lower boundary of the i1-th area in the lower boundary of the M areas, and i1 is a positive integer and less than or equal to M.

For example, the step of performing boundary fitting processing on the i1-th character row includes: obtaining the multiple pixels of each character in the i1-th character row that are closest to the lower boundary of the i1-th area; removing the noise pixels in the multiple pixels to obtain the target pixel; performing linear or quadratic fitting on the target pixel to obtain the character row lower boundary corresponding to the i1-th character row.

For example, in some embodiments, the step of performing local linear or quadratic fitting on the target pixel to obtain the character row lower boundary corresponding to the i1-th character row includes: performing local linear or quadratic fitting on the target pixel corresponding to each character in the i1-th character row respectively to obtain the fitting boundary of each character corresponding to each character in the i1-th character row; then, performing linear or quadratic fitting on the fitting boundary of each character to obtain the character row lower boundary corresponding to the i1-th character row.

For example, in other embodiments, the step of performing local linear or quadratic fitting on the target pixel to obtain the character row lower boundary corresponding to the i1-th character row includes: performing linear or quadratic fitting on the entire target pixel corresponding to each character in the i1-th character row to directly obtain the character row lower boundary corresponding to the i1-th character row.

It should be noted that linear fitting is not enough for character rows that are more curved. Linear fitting and quadratic fitting are set according to the density of the pixel point closest to the lower boundary of the corresponding area in the collected character row. If there are more pixel points closest to the lower boundary of the corresponding area in the collected character row, the quadratic fitting is performed. If there are less pixel points closest to the lower boundary of the corresponding area in the collected character row, linear fitting is performed. For example, a density threshold can be set, and if the density of the pixel points exceeds the density threshold, the quadratic fitting is performed. The fitting of each pixel point is performed by using several local pixel points nearby. For quadratic fitting, abnormality also needs to be determined. For example, if the coefficient of the quadratic term obtained through the quadratic fitting is too large, the result of the quadratic fitting is discarded and the linear fitting is performed; or the offset of the quadratic line obtained by the quadratic fitting at the interpolation point is significantly large as compared to the actual point, the result of the quadratic fitting is also discarded, and linear fitting is performed instead.

For example, as shown in the intermediate corrected image 43 in FIG. 4C, the black dots and short black lines at the bottom of each character row are the pixels of each character that are closest to the lower boundary of the area. It should be noted that the pixel corresponding to the letter in some characters may not have the pixel closest to the lower boundary of the area. As shown in the intermediate corrected image 43 in FIG. 4C, all the pixels corresponding to the letter P and the letter r in the character "Privacy" in the first line are not the pixels closest to the lower boundary of the area.

For example, in step S120, the lower boundary of the area of each intermediate character connected area represents the boundary of the intermediate character connected area away from the X-axis of the second coordinate system OXY. The character row lower boundary of each character row represents the boundary of the character row away from the X-axis of the second coordinate system OXY.

For example, the lower boundary of the area may not be a straight line segment, but may be a line segment with a small wave shape, a zigzag shape, etc., or a line segment with an irregular shape.

For example, in some embodiments, the step of acquiring a plurality of pixels of each character in the i1-th character row closest to the lower boundary of the i1-th area may include: in the Y-axis direction, acquiring multiple pixels of each character in the i1-th character row closest to the lower boundary of the i1-th area, for example, in the Y-axis direction, obtaining the pixel on the pixel column where any one of the pixels of each character in the i1-th character row is located closest to the lower boundary of the i1-th area.

For example, the step of removing the noise pixels in the multiple pixels to obtain the target pixel may include: removing the noise pixels in the multiple pixels according to a predetermined rule to obtain the target pixel. For example, if the slope of a straight line formed by two adjacent pixels in a plurality of pixels is greater than the slope threshold, then the two adjacent pixels are noise pixels. In addition, if the distance between a pixel in the plurality of pixels and the lower boundary of the i1-th area is greater than the distance threshold, the certain pixel is also a noise pixel. For example, the predetermined rule may include a slope threshold and a distance threshold, etc., and the slope threshold and the distance threshold may be set by the user according to actual conditions.

It should be noted that "two adjacent pixels" does not mean that the two pixels are directly adjacent to each other physically, but that the two adjacent pixels are located in different pixel columns. For example, if two adjacent pixels are respectively located in the a-th pixel column and the a+b-th pixel column, a is a positive integer and b is a positive integer. For example, when b is 1, the two adjacent pixels are located in two adjacent pixel columns. Under the circumstances, the two adjacent pixels are adjacent to each other physically. When b is not 1, the two adjacent pixels are not adjacent to each other physically. The two adjacent pixels may not be in contact with each other physically, or they may be in contact with each other. This disclosure provides no limitation thereto. For example, one of the two adjacent pixels is located in the first row of the a-th pixel column, and the other pixel of the two adjacent pixels is located in the 5-th row of the a+b-th pixel column. Under the circumstances, the two adjacent pixels are not in contact with each other physically. If b is 1, and one of the two adjacent pixels is located in, for example, the first row of the a-th pixel column, and the other pixel of the adjacent two pixels is located in, for example, the first row of the a+b-th pixel column, under the circumstances, the two adjacent pixels are in contact with each other physically.

For example, as shown in the intermediate corrected image 44 in FIG. 4D, the line below each character row is the character row lower boundary corresponding to the character row obtained by fitting. The character row lower boundary may not be a straight line segment, but may be a line segment having a small wave shape, a zigzag shape, etc., or a line segment with an irregular shape. It should be noted that, in order to clearly show the character row lower boundary, the intermediate corrected image 44 shown in FIG. 4D is not embodied in the form of a binarized image.

For example, FIG. 4D shows the character row lower boundary of all character rows in the intermediate corrected image 44. The character row lower boundary and the character row corresponding to the character row lower boundary may not overlap or partially overlap. For example, the character row lower boundary corresponding to the character row (for example, the first row) where the character "Privacy" is located overlaps some pixels in all pixels representing letter "y" in the character "Privacy".

For example, two character row lower boundaries corresponding to two adjacent character rows can be separated from each other by a certain distance. It should be noted that, among multiple character row lower boundaries, there may be character row lower boundaries that are parallel to each other. The present disclosure provides no limitation to the parameters of the character row lower boundary, and the length, slope and other parameters of the character row lower boundary can be determined based on the character row corresponding to the character row lower boundary.

Figure 4E:
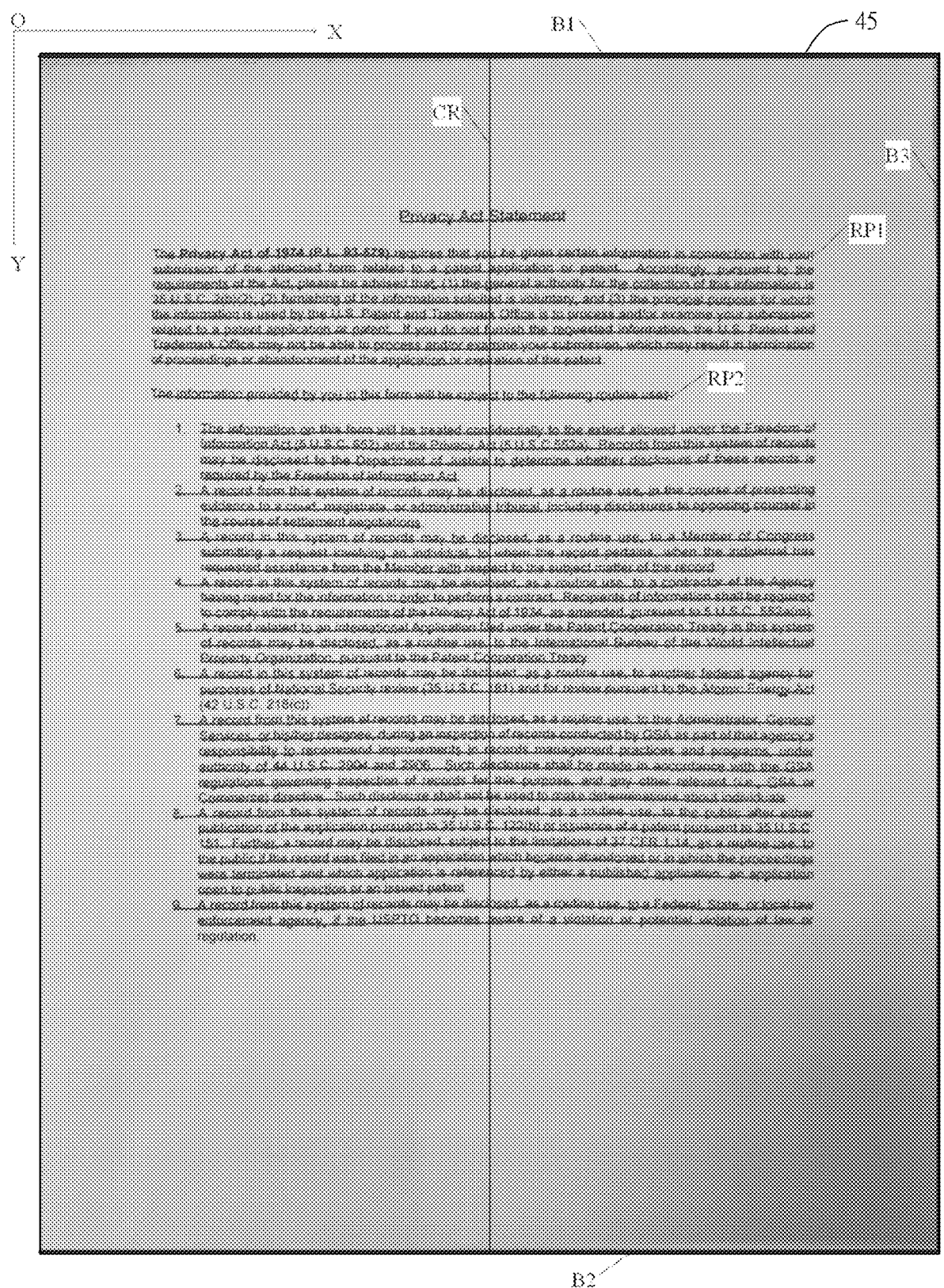
FIG. 4E is a schematic view of an intermediate corrected image showing a local adjustment reference line, a first image boundary, and a second image boundary according to some embodiments of the present disclosure.

FIG. 4E is a schematic view of an intermediate corrected image showing a local adjustment reference line, a first image boundary, and a second image boundary according to some embodiments of the present disclosure.

For example, as shown in FIG. 2, in step S121: Based on the intermediate corrected image, the local adjustment reference line, the first image boundary and the second image boundary of the intermediate corrected image are determined, wherein the first image boundary and the second image boundary are two boundaries of the intermediate corrected image in the first direction.

For example, in step S121, the step of determining the local adjustment reference line includes: taking a middle line of the intermediate corrected image extending in the first direction (i.e., the Y-axis direction) as the local adjustment reference line. The step of determining the first image boundary and the second image boundary of the intermediate corrected image includes: taking the two boundaries of the intermediate corrected image in the first direction as the first image boundary and the second image boundary, respectively.

For example, as shown in FIG. 4E, in some embodiments, the first image boundary B1 is the upper boundary of the intermediate corrected image 45 shown in FIG. 4E, and the second image boundary B2 is the lower boundary of the intermediate corrected image 45 shown in FIG. 4E. For example, the first image boundary B1 and the second image boundary B2 may both be straight lines. For example, the specific shape and positional relationship of the first image boundary B1 and the second image boundary B2 can be determined according to the shape of the intermediate corrected image, which is not specifically limited in the present disclosure. For example, as shown in FIG. 4E, in some embodiments, the shape of the intermediate corrected image 45 is rectangular, so that the first image boundary B1 and the second image boundary B2 are both straight segments and parallel to each other.

It should be noted that in FIG. 4E, in order to clearly show the first image boundary B1 and the second image boundary B2, the straight line segments of the first image boundary B1 and the second image boundary B2 are relatively wide. However, in actual applications, for example, the first image boundary B1 is a row of pixels, and the second image boundary B2 is also a row of pixels.

For example, as shown in FIG. 2, in step S122: The relative offsets of all pixels in the intermediate corrected image are determined according to the first image boundary, the second image boundary, and the M character row lower boundaries.

For example, as shown in FIG. 4E, the intermediate corrected image 45 further has a third image boundary B3, and the third image boundary B3 is a boundary of the intermediate corrected image 45 in the second direction (that is, X-axis direction) perpendicular to the first direction (that is, the Y-axis direction). The third image boundary B3 shown in FIG. 4E is the boundary on the right side of the intermediate corrected image 45. For example, the third image boundary B3 is perpendicular to the first image boundary B1, and perpendicular to the second image boundary B2.

For example, the specific shape and positional relationship of the third image boundary B3 can be determined according to the shape of the intermediate corrected image, which is not specifically limited in the present disclosure. For example, as shown in FIG. 4E, in some embodiments, the shape of the intermediate corrected image 45 is rectangle, so the third image boundary B3 is also a straight line segment.

It should be noted that in the present disclosure, "left side" and "right side" are defined based on the perspective of the viewer.

For example, the intermediate corrected image includes pixels arranged in multiple rows and multiple columns. The row direction of pixels in the intermediate corrected image is the X-axis direction, and the column direction of the pixels in the intermediate corrected image is the Y-axis direction.

For example, each character row lower boundary in the M character row lower boundaries includes reference pixels, for example, the reference pixels RP1 and RP2 as shown in FIG. 4E. The reference pixel of each character row lower boundary is the pixel of each character row lower boundary closest to the third image boundary B3. Each character row lower boundary has a reference pixel, that is, the M character row lower boundaries has M reference pixels, and the M reference pixels correspond to the M character row lower boundaries one-to-one. A part of the M reference pixels can be located in the same pixel column, and a part of the M reference pixels can also be located in different pixel columns, for example, the reference pixel RP1 and the reference pixel RP2 shown in FIG. 4E are located in different pixel columns.

For example, in some embodiments, step S122 includes: determining the relative offset of all pixels on the M character row lower boundaries other than the reference pixels on the M character row lower boundaries according to the position of each pixel on the M character row lower boundaries; determining the relative offsets of the remaining pixels outside the M character row lower boundaries in the intermediate corrected image and the reference pixels on the M character row lower boundaries according to the relative offset of all pixels on the M character row lower boundaries other than the reference pixels on the M character row lower boundaries, the first image boundary and the second image boundary.

For example, the relative offset of all pixels in the intermediate corrected image includes the relative offset of each pixel on the M character row lower boundaries and the relative offset of the remaining pixels outside the M character row lower boundaries.

For example, the position of the pixel represents the coordinate value of the pixel in the second coordinate system OXY, for example, the Y-axis coordinate value.

For example, in step S122, the step of determining the relative offset of all pixels on the M character row lower boundaries other than the reference pixels on the M character row lower boundaries according to the position of each pixel on the M character row lower boundaries includes, for the lower boundary of the t1-th character row in the M character row lower boundaries, obtaining the a1-th pixel on the t1-th character row lower boundary, wherein the a1-th pixel is not the reference pixel on the t1-th character row lower boundary, and t1 is positive integer less than or equal to M, a1 is a positive integer less than or equal to the number of all pixels on the t1-th character row lower boundary; in response to that the pixel column where the a1-th pixel is located is adjacent to the pixel column where the reference pixel on the t1-th character row lower boundary is located, determining the relative offset corresponding to the a1-th pixel according to the positional relationship between the reference pixel on the t1-th character row lower boundary and the a1-th pixel; in response to that the pixel column where the a1-th pixel is located is not adjacent to the pixel column where the reference pixel on the t1-th character row lower boundary is located, obtaining the a2-th pixel on the t1-th character row lower boundary, and determining the relative offset corresponding to the a1-th pixel according to the positional relationship between the a1-th pixel and the a2-th pixel, wherein the a2-th pixel is not the reference pixel on the t1-th character row lower boundary, and the a2-th pixel is located on one side of the a1-th pixel close to the reference pixel on the t1-th character row lower boundary, and the pixel column where the a1-th pixel is located is adjacent to the pixel column where the a2-th pixel is located.

The above process is performed respectively on each pixel on each character row lower boundary in the M character row lower boundaries, so as to determine the relative offset of all pixels on the M character row lower boundaries other than the reference pixels on the M character row lower boundaries.

Figure 5A:
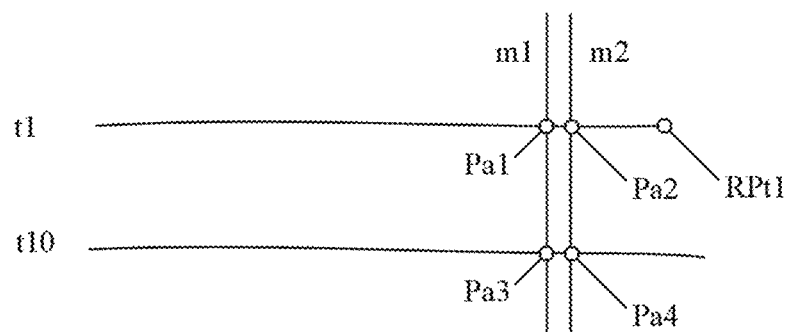
FIG. 5A is a partial schematic view of an intermediate corrected image provided by at least one embodiment of the present disclosure.
Figure 5B:
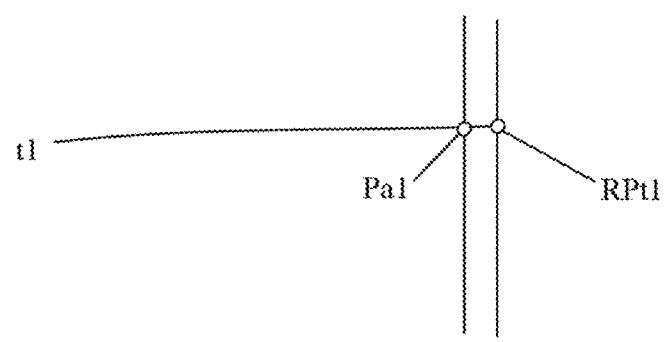
FIG. 5B is a partial schematic view of another intermediate corrected image provided by at least one embodiment of the present disclosure.

FIG. 5A is a partial schematic view of an intermediate corrected image provided by at least one embodiment of the present disclosure. FIG. 5B is a partial schematic view of another intermediate corrected image provided by at least one embodiment of the present disclosure.

For example, as shown in FIG. 5A and FIG. 5B, the M character row lower boundaries of the intermediate corrected image include the t1-th character row lower boundary. Pixel RPt1 represents the reference pixel of the t1-th character row lower boundary. The a1-th pixel Pa1 and the a2-th pixel Pa2 represent two adjacent pixels on the t1-th character row lower boundary.

For example, as shown in FIG. 5A, the M character row lower boundaries of the intermediate corrected image further include the t10-th character row lower boundary, and the a3-th pixel Pa3 and the a4-th pixel Pa4 represent the two adjacent pixels on the t10-th character row lower boundary. The pixel column where the a1-th pixel Pa1 and the a3-th pixel Pa3 are located is the pixel column m1, and the pixel column where the a2-th pixel Pa2 and the a4-th pixel Pa4 are located is the pixel column m2. The a1-th pixel Pa1 and the a2-th pixel Pa2 can be located in the same row or in different rows. The a3-th pixel Pa3 and the a4-th pixel Pa4 can be located in the same row or in different rows, which are determined according to the actual situation.

For example, in an example, as shown in FIG. 5A, under the condition where the pixel column where the a1-th pixel Pa1 is located and the pixel column where the reference pixel RPt1 on the t1-th character row lower boundary is located are not adjacent to each other, the a2-th pixel Pa2 on the t1-th character row lower boundary is obtained. Based on the positional relationship between the a1-th pixel Pa1 and the a2-th pixel Pa2, the relative offset corresponding to the a1-th pixel Pa1 is determined, that is, the relative offset corresponding to the a1-th pixel Pa1 is expressed as:

$$dd_{Pa1}=dy_{Pa1}-dy_{Pa2}=(y_{Pa1}-y(\text{ref}))-(y_{Pa2}-y(\text{ref}))=y_{Pa1}-y_{Pa2}$$

In the equation, $dd_{Pa1}$ represents the relative offset of the a1-th pixel Pa1, $dy_{Pa1}$ represents the local adjustment offset of the a1-th pixel Pa1, $dy_{Pa2}$ represents the local adjustment offset of the a2-th pixel Pa2, and $y_{Pa1}$ represents the Y-axis coordinate value of the a1-th pixel Pa1 in the second coordinate system OXY, $y_{Pa2}$ represents the Y-axis coordinate value of the a2-th pixel Pa2 in the second coordinate system OXY, and y(ref) represents the Y-axis coordinate value of the reference point in the second coordinate system OXY. Here y(ref) is a hypothetical reference point, which is used to calculate the relative offset of each pixel. The reference point can be set according to the actual situation, and the disclosure provides no limitation to the specific position.

The a2-th pixel Pa2 is located on one side of the a1-th pixel Pa1 near the reference pixel RPt1 on the t1-th character row lower boundary, that is to say, on the t1-th character row lower boundary, the a2-th pixel Pa2 is located between the a1-th pixel Pa1 and the reference pixel RPt1. The pixel column m1 where the a1-th pixel is located is adjacent to the pixel column m2 where the a2-th pixel is located.

Similarly, the relative offset of the a3-th pixel Pa3 is expressed as:

$$dd_{Pa3}=y_{Pa3}-y_{Pa4}$$

In the equation, $dd_{Pa3}$ represents the relative offset of the a3-th pixel Pa3, $y_{Pa3}$ represents the Y-axis coordinate value of the a3-th pixel Pa3 in the second coordinate system OXY, and $y_{Pa4}$ represents the Y-axis coordinate value of the a4-th pixel Pa4 in the second coordinate system OXY.

That is to say, the relative offset of each pixel on the character row lower boundary in the intermediate corrected image represents the Y-axis coordinate value of the pixel minus the Y-axis coordinate value of the pixel on the pixel column adjacent to the right side of the pixel column where the pixel is located and on the same character row lower boundary as the pixel.

The present disclosure is not limited thereto. In another example, the relative offset of the a1-th pixel Pa1 can also be expressed as: $dd_{Pa1}=y_{Pa2}-y_{Pa1}$, and the relative offset of the a3-th pixel Pa3 can also be expressed as: $dd_{Pa3}=y_{Pa4}-y_{Pa3}$. Under the circumstances, the relative offset of each pixel on the character row lower boundary in the intermediate corrected image represents the Y-axis coordinate value of the pixel on the pixel column adjacent to the right side of the pixel column where the pixel is located and on the same character row lower boundary as the pixel minus the Y-axis coordinate value of the pixel.

In the embodiments of the present disclosure, it is exemplified that the relative offset of each pixel on the character row lower boundary in the intermediate corrected image represents the Y-axis coordinate value of the pixel minus the Y-axis coordinate value of the pixel on the pixel column adjacent to the right side of the pixel column where the pixel is located and on the same character row lower boundary as the pixel.

It should be noted that for the reference pixel RPt1 on the t1-th character row lower boundary, since there is no pixel on the right side of the reference pixel RPt1 on the t1-th character row lower boundary, under the circumstances, the relative offset of the reference pixel RPt1 cannot be calculated. The relative offset of the reference pixel RPt1 can be calculated in the subsequent interpolation method.

It should be noted that FIG. 5A only schematically shows two character row lower boundaries, but the present disclosure is not limited thereto, and the number and position of the character row lower boundary in the intermediate corrected image can be determined according to actual conditions. In addition, in order to clearly show the a1-th pixel Pa1, the a2-th pixel Pa2, the a3-th pixel Pa3, and a4-th pixel Pa4, there is a large gap between the a1-th pixel Pa1 and the a2-th pixel Pa2, and there is also a large gap between the a3-th pixel Pa3 and the a4-th pixel Pa4. However, it should be understood that, in fact, the a1-th pixel Pa1 and the a2-th pixel Pa2 are adjacent to each other, and the a3-th pixel Pa3 and the a4-th pixel Pa4 are also adjacent to each other, that is to say, the pixel column m1 and the pixel column m2 are directly adjacent to each other physically, and there is no other pixel column between the pixel column m1 and the pixel column m2.

It should be noted that in the embodiments of the present disclosure, the "relative offset" of a certain pixel on the character row lower boundary in the intermediate corrected image can represent the difference between the Y-axis coordinate value of a certain pixel in the second coordinate system OXY and the Y-axis coordinate value of the pixel located on the pixel column adjacent to the right side of the pixel column where the certain pixel is located and on the same character row lower boundary as the pixel in the second coordinate system OXY. The "local adjustment offset" of a certain pixel on the intermediate corrected image may indicate the offset of the certain pixel in the Y-axis direction in the second coordinate system OXY that needs to be adjusted.

As shown in FIG. 5B, under the condition that the pixel column where the a1-th pixel Pa1 is located is adjacent to the pixel column where the reference pixel RPt1 on the t1-th character row lower boundary is located, according to the positional relationship between the reference pixel PRt1 on the t1-th character row lower boundary and the a1-th pixel Pa1, the relative offset corresponding to the a1-th pixel Pa1 is determined, that is, the relative offset corresponding to the a1-th pixel Pa1 is expressed as:

$$dd_{Pa1} = y_{Pa1} - y_{RPt1}$$

In the equation, $dd_{Pa1}$ represents the relative offset of the a1-th pixel Pa1, $y_{Pa1}$ represents the Y-axis coordinate value of the a1-th pixel Pa1 in the second coordinate system OXY, and $y_{Rpt1}$ represents the Y-axis coordinate value of the reference pixel RPt1 in the second coordinate system OXY.

Figure 6A:
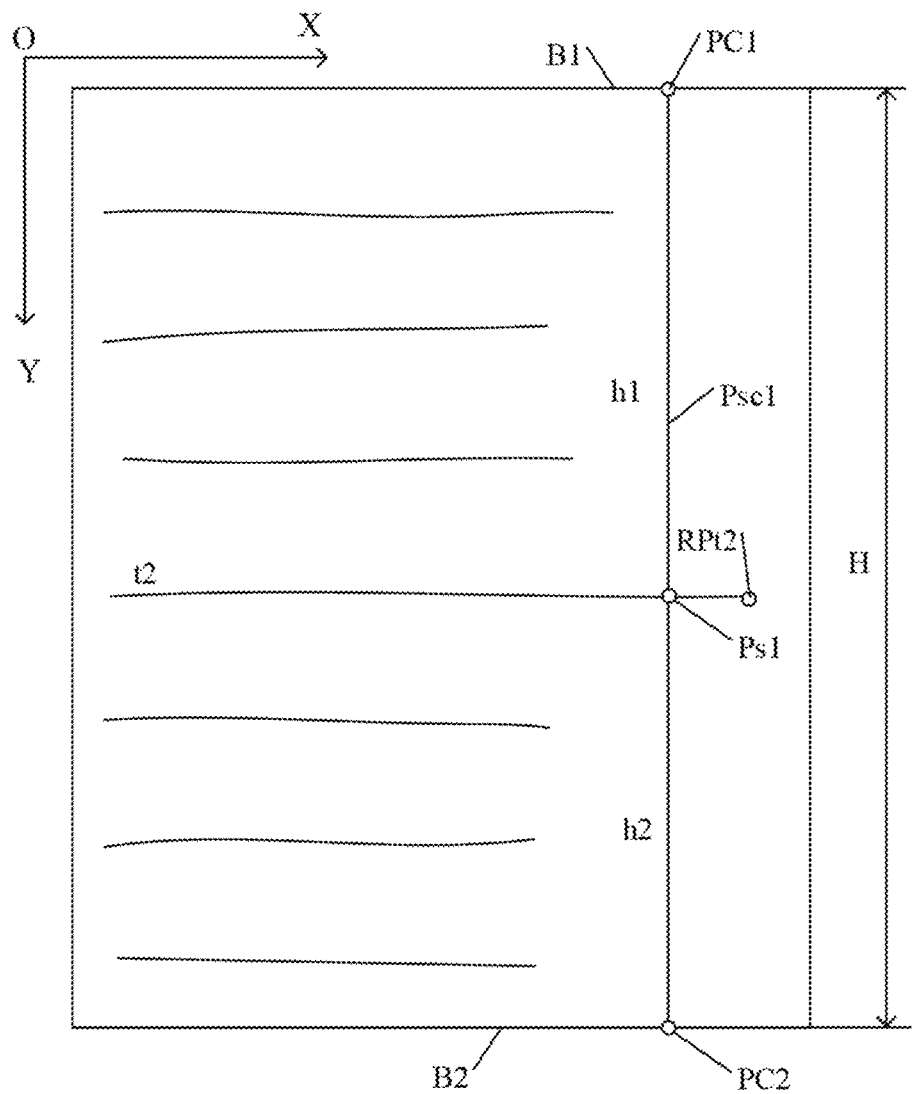
FIG. 6A is another schematic view of an intermediate corrected image provided by at least one embodiment of the present disclosure.
Figure 6B:
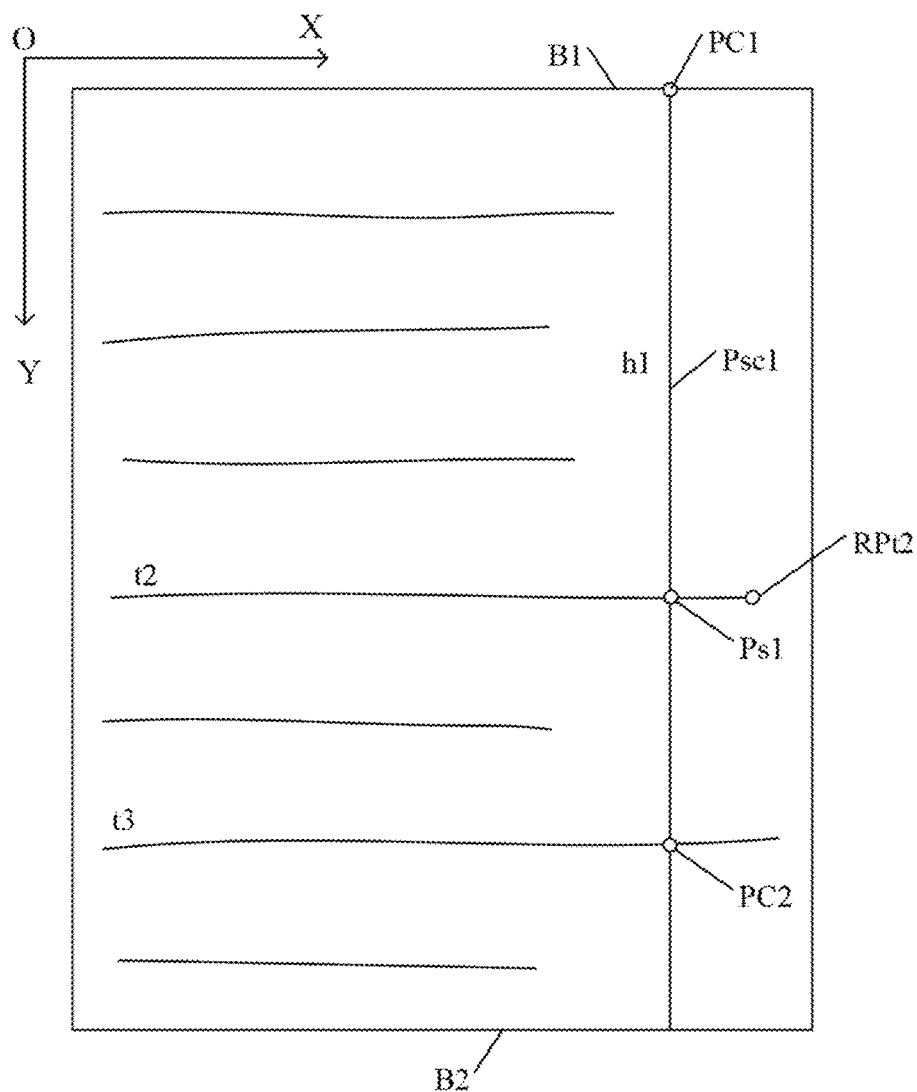
FIG. 6B is another schematic view of another intermediate corrected image provided by at least one embodiment of the present disclosure.
Figure 6C:
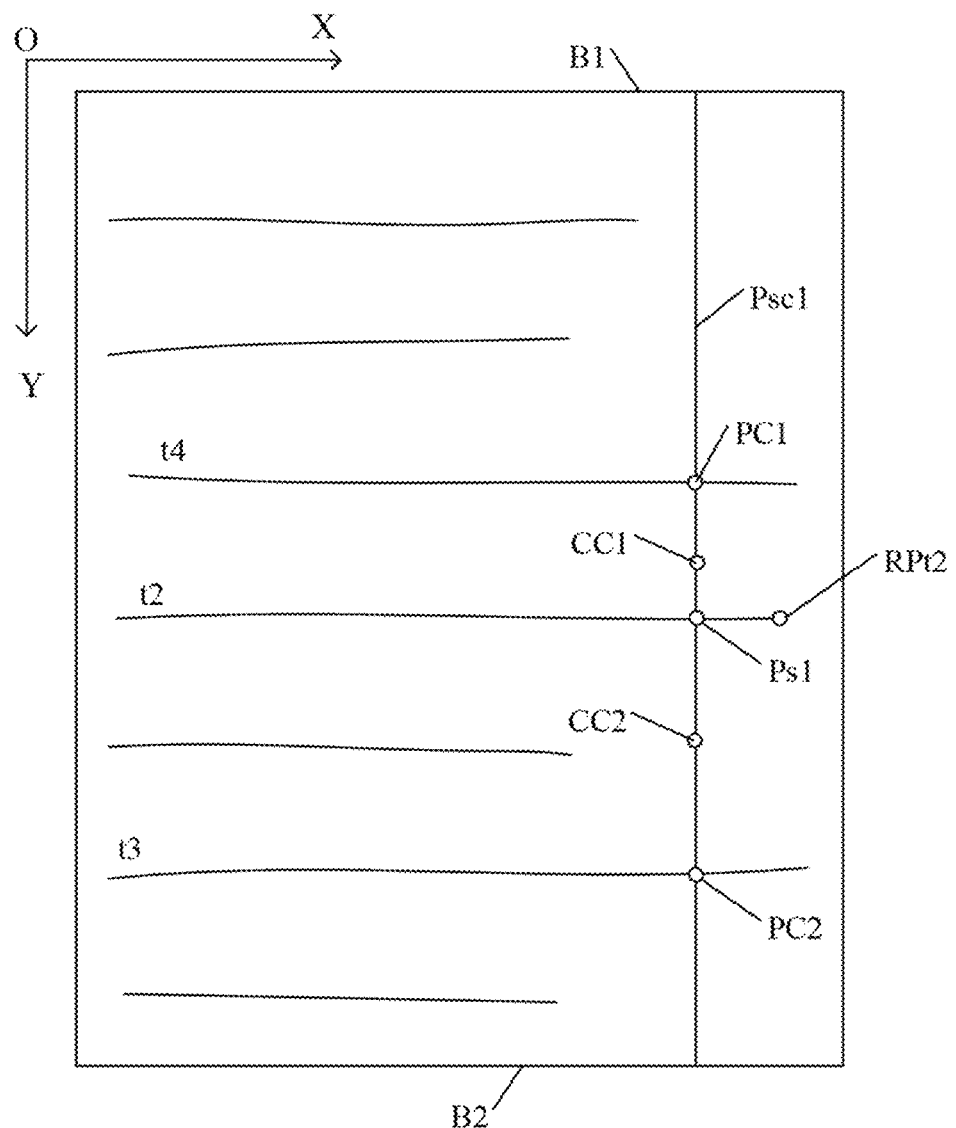
FIG. 6C is another schematic view of still another intermediate corrected image provided by at least one embodiment of the present disclosure.
Figure 6D:
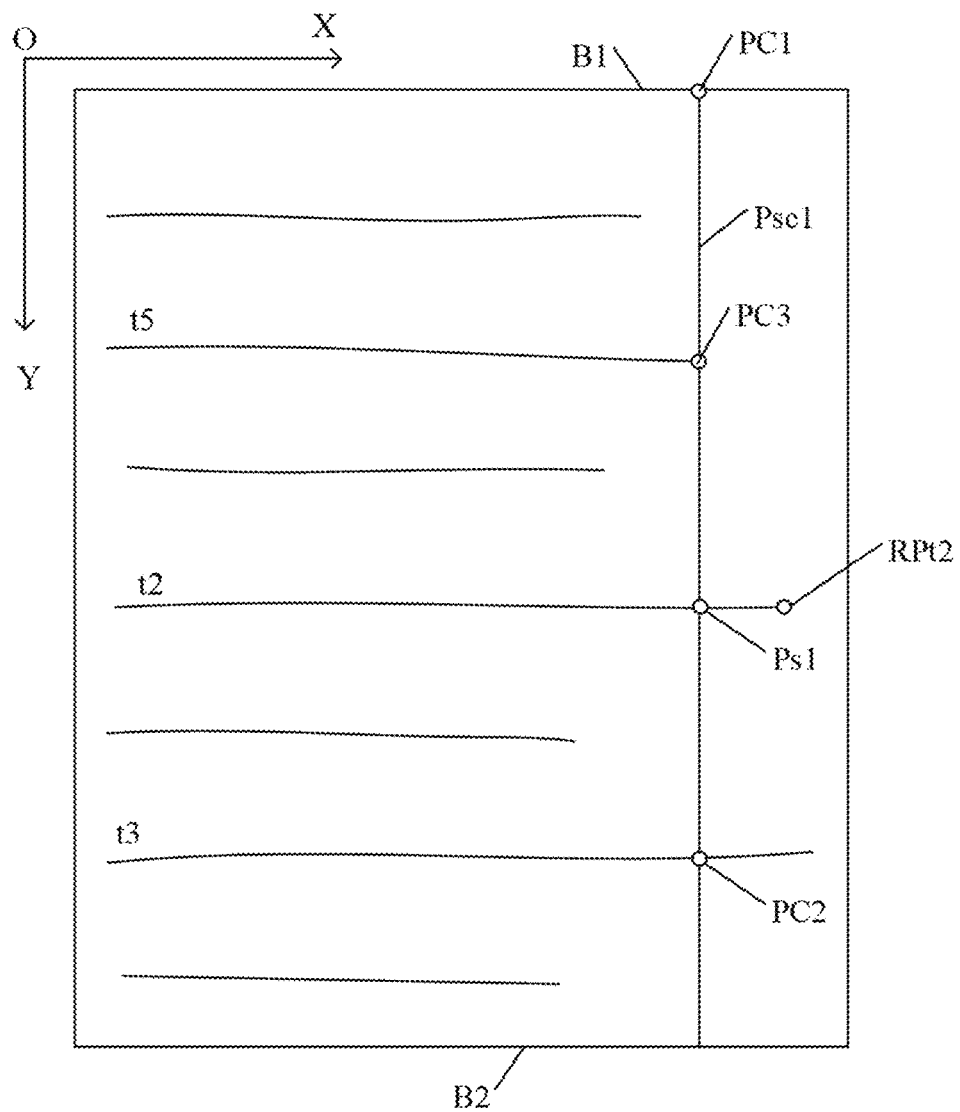
FIG. 6D is another schematic view of yet another intermediate corrected image provided by at least one embodiment of the present disclosure.

FIG. 6A is another schematic view of an intermediate corrected image provided by at least one embodiment of the present disclosure. FIG. 6B is another schematic view of another intermediate corrected image provided by at least one embodiment of the present disclosure. FIG. 6C is another schematic view of still another intermediate corrected image provided by at least one embodiment of the present disclosure. FIG. 6D is another schematic view of yet another intermediate corrected image provided by at least one embodiment of the present disclosure.

For example, in some embodiments, as shown in FIG. 6A to FIG. 6D, the M character row lower boundaries include the t2-th character row lower boundary, wherein t2 is a positive integer less than or equal to M.

For example, in step S122, the step of determining the relative offsets of the remaining pixels outside the M character row lower boundaries in the intermediate corrected image and the reference pixels on the M character row lower boundaries according to the relative offset of all pixels on the M character row lower boundaries other than the reference pixels on the M character row lower boundaries, the first image boundary and the second image boundary includes obtaining the first selected pixel located on the t2-th character row lower boundary and determining the first selected pixel column where the first selected pixel column is located; determining the first intersection pixel and second intersection pixel corresponding to the first selected pixel on the first selected pixel column; in response to the first intersection pixel located on the first image boundary and the second intersection pixel located on the second image boundary, and according to the distance between the first image boundary and the second image boundary, the distance between the first selected pixel and the first intersection pixel and the relative offset of the first selected pixel, determining the relative offset of the first intersection pixel; according to the relative offset of the first selected pixel and the relative offset of the first intersection pixel, determining the relative offset of all pixels located between the first selected pixel and the first intersection pixel in the first selected pixel column; according to the distance between the first image boundary and the second image boundary, the distance between the first selected pixel and the second intersection pixel and the relative offset of the first selected pixel, determining the relative offset of the second intersection pixel; according to the relative offset of the first selected pixel and the relative amount of the second intersection pixel, determining the relative offsets of all pixels located between the first selected pixel and the second intersection pixel in the first selected pixel column; in response to the first intersection pixel located on the first image boundary or the second image boundary and the second intersection pixel located on a certain character row lower boundary in the M character row lower boundaries, and according to the distance between the first image boundary and the second image boundary, the distance between the first selected pixel and the first intersection pixel and the relative offset of the first selected pixel, determining the relative offset of the first intersection pixel; according to the relative offset of the first selected pixel and the relative offset of the first intersection pixel, determining the relative offset of all pixels located between the first selected pixel and the first intersection pixel in the first selected pixel column; according to the relative offset of the first selected pixel and the relative offset of the second intersection pixel, determining the relative offset of all pixels located between the first selected pixel and the second intersection pixel in the first selected pixel column; in response to the first intersection pixel and the second intersection pixel respectively located on the certain two character row lower boundaries in the M character row lower boundaries, according to the relative offset of the first selected pixel and the relative offset of the first intersection pixel, determining the relative offset of all pixels located between the first selected pixel and the first intersection pixel in the first selected pixel column; according to the relative offset of the first selected pixel and the relative offset of the second intersection pixel, determining the relative offset of all pixels located between the first selected pixel and the second intersection pixel in the first selected pixel column.

For example, as shown in FIG. 6A to FIG. 6C, the first selected pixel column Psc1 where the first selected pixel Ps1 is located extends along the first direction, and the first selected pixel Ps1 is not the reference pixel RPt2 on the t2-th character row lower boundary, that is, the first selected pixel Ps1 and the reference pixel RPt2 are different pixels.

For example, on the first selected pixel column Psc1, the first intersection pixel and the second intersection pixel corresponding to the first selected pixel Ps1 are PC1 and PC2 respectively. Except for the first selected pixel Ps1, there is no other pixel which is on the character row lower boundary and is not the reference pixel on the character row lower boundary between the first intersection pixel PC1 and the second intersection pixel PC2 on the first selected pixel column Psc1. In other words, on the first selected pixel column Psc1, there is only the first selected pixel Ps1 between the intersection pixel PC1 and the second intersection pixel PC2 on the character row lower boundary, and which is not the reference pixel. As shown in FIG. 6D, between the first intersection pixel PC1 and the first selected pixel Ps1, there is an intersection pixel PC3 between the first selected pixel column Psc1 and the character row lower boundary t5. However, the intersection pixel PC3 is the reference pixel of the character row lower boundary t5, that is, the pixel closest to the third image boundary B3 on the character row lower boundary t5. Under the circumstances, the first intersection pixel PC1 is still the intersection of the first selected pixel column Psc1 and the first image boundary B1. When the relative offset of all pixels between the first intersection pixel PC1 and the first selected pixel Ps1 is calculated subsequently, the relative offset of the intersection pixel PC3 can be calculated and obtained.

For example, as shown in FIG. 6A, under the condition that the first intersection pixel PC1 is located on the first image boundary B1 and the second intersection pixel PC2 is located on the second image boundary B2, since the first intersection pixel PC1 and the second intersection pixel PC2 are located at the first image boundary B1 and second image boundary B2 respectively, the relative offsets of all pixels on the first image boundary B1 and second image boundary B2 are unknown. Therefore, the relative offsets of the first intersection pixel PC1 and the second intersection pixel PC2 need to be calculated. Under the circumstances, according to the distance H between the first image boundary B1 and the second image boundary B2, the distance h1 between the first selected pixel Ps1 and the first intersection pixel PC1, and the relative offset of the first selected pixel Ps1, the relative offset of the first intersection pixel PC1 is determined; based on the distance H between the first image boundary B1 and second image boundary B2, the distance h2 between the first selected pixel Ps1 and the second intersection pixel PC2, and the relative offset of the first selected pixel Ps1, the relative offset of the second intersection pixel PC2 is determined. Then, linear interpolation is performed according to the relative offset the first selected pixel Ps1 and the relative offset of the first intersection pixel PC1, the relative offsets of all pixels located between the first selected pixel Ps1 and the first intersection pixel PC1 in the first selected pixel column Psc1 are determined; linear interpolation is performed according to the relative offset of the first selected pixel Ps1 and the relative offset of the second intersection pixel PC2, the relative offsets of all pixels located between the first selected pixel Ps1 and the second intersection pixel PC2 in the first selected pixel column Psc1 are determined.

For example, as shown in FIG. 6A, the distance H between the first image boundary B1 and the second image boundary B2 is the length of the intermediate corrected image in the Y-axis direction.

For example, in the case where the first intersection pixel PC1 is located on the first image boundary B1 or the second image boundary B2 and the second intersection pixel PC2 is located on a certain character row lower boundary in the M character row lower boundaries, as shown in FIG. 6B, in some examples, the first intersection pixel PC1 is located on the first image boundary B1, and the second intersection pixel PC2 is located on a certain character row lower boundary t3 in the M character row lower boundaries, since the first intersection pixel PC1 is located on the first image boundary B1, the relative offsets of all pixels on the first image boundary B1 are unknown. The second intersection pixel PC2 is located on the character row lower boundary t3 and is not the reference pixel on the character row lower boundary t3, the relative offset of the second intersection pixel PC2 has been obtained. Therefore, the relative offset of the first intersection pixel PC1 needs to be calculated first. Under the circumstances, according to the distance H between the first image boundary B1 and the second image boundary B2, the distance h1 between the first selected pixel Ps1 and the first intersection pixel PC1, and the relative offset of the first selected pixel Ps1, the relative offset of the first intersection pixel PC1 is determined. Then, linear interpolation is performed according to the relative offset of the first selected pixel Ps1 and the relative offset of the first intersection pixel PC1, the relative offsets of all pixels located between the first selected pixel Ps1 and the first intersection pixel PC1 in the first selected pixel column Psc1 is determined; linear interpolation is performed according to the relative offset of the first selected pixel Ps1 and the relative offset of the second intersection pixel PC2, the relative offsets of all pixels located between the first selected pixel Ps1 and the second intersection pixel PC2 in the first selected pixel column Psc1 are determined.

For example, the step of determining the relative offset of the first intersection pixel according to the distance between the first image boundary and the second image boundary, the distance between the first selected pixel and the first intersection pixel, and the relative offset of the first selected pixel includes: in response to that the distance between the first image boundary and the second image boundary and the distance between the first selected pixel and the first intersection pixel satisfy the first relation, the relative offset of the first intersection pixel is determined as a predetermined value; in response to that the distance between the first image boundary and the second image boundary and the distance between the first selected pixel and the first intersection pixel satisfy the second relation, the relative offset of the first intersection pixel is determined as the relative offset of the first selected pixel.

For example, the first relation is expressed as:

$$h1 > H/DH$$

The second relation is expressed as:

$$h1 \leq H/DH$$

In the relation, h1 is the distance between the first intersection pixel PC1 and the first selected pixel Ps1, H is the distance between the first image boundary B1 and the second image boundary B1, and DH is a constant.

For example, in an example, DH may be 10, and the predetermined value may be 0.

For example, the step of determining the relative offset of the second intersection pixel according to the distance between the first image boundary and the second image boundary, the distance between the first selected pixel and the second intersection pixel, and the relative offset of the first selected pixel includes in response to that the distance between the first image boundary and the second image boundary and the distance between the first selected pixel and the second intersection pixel satisfy the third relation, the relative offset of the second intersection pixel is determined as a predetermined value; in response to that the distance between the first image boundary and the second image boundary and the distance between the first selected pixel and the second intersection pixel satisfy the fourth relation, the relative offset of the second intersection pixel is determined as the relative offset of the first selected pixel.

For example, the third relation is expressed as:

$$h2 > H/DH$$

The fourth relation is expressed as:

$$h2 \leq H/DH$$

In the relation, h2 is the distance between the second intersection pixel and the first selected pixel.

For example, in some embodiments, for the relative offsets of all pixels located between the first selected pixel and the first intersection pixel in the first selected pixel column, under the condition that the first intersection pixel PC1 is located on the first image boundary B1 and the second intersection pixel PC2 is located on the second image boundary B2, or the first intersection pixel PC1 is located on the first image boundary B1 or the second image boundary B2 and the second intersection pixel PC2 is located on a certain character row lower boundary in the M character row lower boundaries (for example, character row lower boundary t3), that is, in the examples shown in FIG. 6A and FIG. 6B, the step of determining the relative offsets of all pixels between the first selected pixel and the first intersection pixel in the first selected pixel column according to the relative offset of the first selected pixel and the relative offset of the first intersection pixel includes: in response to that the distance between the first image boundary and the second image boundary and the distance between the first intersection pixel and the first selected pixel satisfy the first relation, linear interpolation is performed on the relative offset of the first selected pixel and the relative offset of the first intersection pixel, so as to obtain the relative offset of all pixels between the first selected pixel and the first intersection pixel in the first selected pixel column; in response to that the distance between the first image boundary and the second image boundary and the distance between the first intersection pixel and the first selected pixel satisfy the second relation, the relative offsets of all pixels located between the first selected pixel and the first intersection pixel in the first selected pixel column are determined as the relative offset of the first selected pixel.

In the case where the distance h1 between the first selected pixel Ps1 and the first intersection pixel PC1 and the distance H between the first image boundary B1 and the second image boundary B2 satisfy the first relation, the relative offset of the first intersection pixel PC1 is 0. Then, the relative offsets of all pixels between the first intersection pixel PC1 and the first selected pixel Ps1 are obtained by performing linear interpolation between 0 and the relative offset of the first selected pixel Ps1, such that the relative offset of the pixel closer to the first selected pixel Ps1 is closer to the relative offset of the first selected pixel Ps1, and the relative offset of the pixel closer to the first intersection pixel PC1 is closer to the relative offset of the first intersection pixel PC1, i.e., 0.

Under the condition that the distance h1 between the first selected pixel Ps1 and the first intersection pixel PC1 and the distance H between the first image boundary B1 and the second image boundary B2 satisfy the second relation, the relative offset of the first intersection pixel PC1 is equal to the relative offset of the first selected pixel Ps1. That is, when the distance between the first selected pixel Ps1 and the first intersection pixel PC1 is relatively short, the relative offset of the first intersection pixel PC1 can be set as the relative offset of the first selected pixel Ps1. Under the circumstances, the relative offsets of all pixels between the first intersection pixel PC1 and the first selected pixel Ps1 are the same, which are the relative offset of the first selected pixel Ps1.

For example, in some embodiments, for the relative offsets of all pixels located between the first selected pixel and the second intersection pixel in the first selected pixel column, under the condition that the first intersection pixel PC1 is located on the first image boundary B1 and the second intersection pixel PC2 is located on the second image boundary B2, that is, in the example shown in FIG. 6A, the step of determining the relative offsets of all pixels located between the first selected pixel and the second intersection pixel in the first selected pixel column according to the relative offset of the first selected pixel and the relative offset of the second intersection pixel includes: in response to that the distance between the first image boundary and the second image boundary and the distance between the second intersection pixel and the first selected pixel satisfy the third relation, linear interpolation is performed on the relative offset of the first selected pixel and the relative offset of the second intersection pixel, so as to obtain the relative offsets of all pixels between the first selected pixel and the second intersection pixel in the first selected pixel column; in response to that the distance between the first image boundary and the second image boundary and the distance between the second intersection pixel and the first selected pixel satisfy the fourth relation, the relative offsets of all pixels between the first selected pixel and the second intersection pixel in the first selected pixel column are determined as the relative offset of the first selected pixel.

In the case that the distance h2 between the first selected pixel Ps1 and the second intersection pixel PC2 and the distance H between the first image boundary B1 and the second image boundary B2 satisfy the third relation, the relative offset of the second intersection pixel PC2 is 0. Then, the relative offsets of all pixels between the second intersection pixel PC2 and the first selected pixel Ps1 are obtained by performing linear interpolation between 0 and the relative offset of the first selected pixel Ps1, such that the relative offset of the pixel closer to the first selected pixel Ps1 is closer to the relative offset of the first selected pixel Ps1, and the relative offset of the pixel closer to the second intersection pixel PC2 is closer to the relative offset of the second intersection pixel PC2, that is, 0.

Under the condition that the distance h2 between the first selected pixel Ps1 and the second intersection pixel PC2 and the distance H between the first image boundary B1 and the second image boundary B2 satisfy the fourth relation, the relative offset of the second intersection pixel PC2 is equal to the relative offset of the first selected pixel Ps1. That is, when the distance between the first selected pixel Ps1 and the second intersection pixel PC2 is relatively short, the relative offset of the second intersection pixel PC2 can be set as the relative offset of the first selected pixel Ps1. Under the circumstances, the relative offsets of all pixels between the second intersection pixel PC2 and the first selected pixel Ps1 are the same, which are the relative offset of the first selected pixel Ps1.

For example, under the condition that the first intersection pixel PC1 is located on the first image boundary B1 or the second image boundary B2 and the second intersection pixel PC2 is located on a certain character row lower boundary (for example, character row lower boundary t3) in the M character row lower boundaries, that is, in the example shown in FIG. 6B, the step of determining the relative offsets of all pixels located between the first selected pixel and the second intersection pixel in the first selected pixel column according to the relative offset of the first selected pixel and the relative offset of the second intersection pixel includes: performing linear interpolation on the relative offset of the first selected pixel and the relative offset of the second intersection pixel to obtain the relative offsets of all pixels between the first selected pixel and the second intersection pixel in the first selected pixel column.

When the first selected pixel Ps1 and the second intersection pixel PC2 are both located on the character row lower boundary, the relative offsets of all pixels between the second intersection pixel PC2 and the first selected pixel Ps1 are obtained by performing linear interpolation between the relative offset of the second intersection pixel PC2 and relative offset of the first selected pixel Ps1.

For example, in the case where the first intersection pixel PC1 and the second intersection pixel PC2 are respectively located on two character row lower boundaries in the M character row lower boundaries, that is, in the example shown in FIG. 6C, the step of determining the relative offsets of all pixels between the first selected pixel and the first intersection pixel in the first selected pixel column according to the relative offset of the first selected pixel and the relative offset of the first intersection pixel includes: performing linear interpolation on the relative offset of the first selected pixel and the relative offset of the first intersection pixel, so as to obtain the relative offsets of all pixels located between the first selected pixel and the first intersection pixel in the first selected pixel column.

The step of determining the relative offsets of all pixels located between the first selected pixel and the second intersection pixel in the first selected pixel column according to the relative offset of the first selected pixel and the relative offset of the second intersection pixel includes: performing linear interpolation on the relative offset of the first selected pixel and the relative offset of the second intersection pixel, so as to obtain the relative offsets of all pixels located between the first selected pixel and the second intersection pixel in the first selected pixel column.

For example, in the case where the first intersection pixel PC1 and the second intersection pixel PC2 are respectively located on two character row lower boundaries in the M character row lower boundaries, as shown in FIG. 6C, in some examples, the first intersection pixel PC1 is located on the character row lower boundary t4 in the M character row lower boundaries, the second intersection pixel PC2 is located on the character row lower boundary t3 in the M character row lower boundaries. Because the first intersection pixel PC1 and the second intersection pixel PC2 are both on the character row lower boundary, and not the reference pixel of the character row lower boundary (t3 and t4), the relative offsets of the first intersection pixel PC1 and the second intersection pixel PC2 have been obtained. Therefore, the linear interpolation can be directly performed on the relative offset of the first selected pixel Ps1 and the relative offset of the first intersection pixel PC1, so as to determine the relative offsets of all pixels between the first selected pixel Ps1 and the first intersection pixel Pc1 in the first selected pixel column Psc1; the linear interpolation can be directly performed on the relative offset of the first selected pixel Ps1 and the relative offset of the second intersection pixel PC2, so as to determine the relative offsets of all pixels located between the first selected pixel Ps1 and the second intersection pixel PC2 in the first selected pixel column Psc1.

For example, as shown in FIG. 6C, for the pixel CC1 located between the first selected pixel Ps1 and the first intersection pixel PC1 in the first selected pixel column Psc1, the relative offset of this pixel CC1 is obtained by performing linear interpolation on the relative offset of the first selected pixel Ps1 and the relative offset of the first intersection pixel PC1. For the pixel CC2 between the first selected pixel Ps1 and the second intersection pixel PC2 in the first selected pixel column Psc1, the relative offset of the pixel CC2 is obtained by performing linear interpolation on the relative offset of the first selected pixel Ps1 and the relative offset of the second intersection pixel PC2.

It should be noted that FIG. 6A to FIG. 6D only show part of the character row lower boundary in the intermediate corrected image, and the present disclosure is not limited to the examples shown in FIG. 6A to FIG. 6D. For example, as shown in FIG. 6A to FIG. 6D, in the Y-axis direction, there are multiple character row lower boundaries between the t2-th character row lower boundary and the first image boundary B1, and there are also multiple character row lower boundaries between the t2-th character row lower boundary and the second image boundary B2. However, in other embodiments, there may be only one character row lower boundary or no character row lower boundary between the t2-th character row lower boundary and the first image boundary B1. Similarly, there may also be only one character row lower boundary or no character row lower boundary between the t2-th character row lower boundary and the second image boundary B2. In addition, as shown in FIG. 6B to FIG. 6D, in the Y-axis direction, there is a character row lower boundary between the t2-th character row lower boundary and the character row lower boundary t3. However, in other embodiments, there may also be multiple character row lower boundaries or no character row lower boundary between the t2-th character row lower boundary and the character row lower boundary t3. As shown in FIG. 6C, in the Y-axis direction, there is no character row lower boundary between the t2-th character row lower boundary and the character row lower boundary t4. However, in other embodiments, there can also be one or more character row lower boundaries between the t2-th character row lower boundary and the character row lower boundary t4.

Figure 7A:
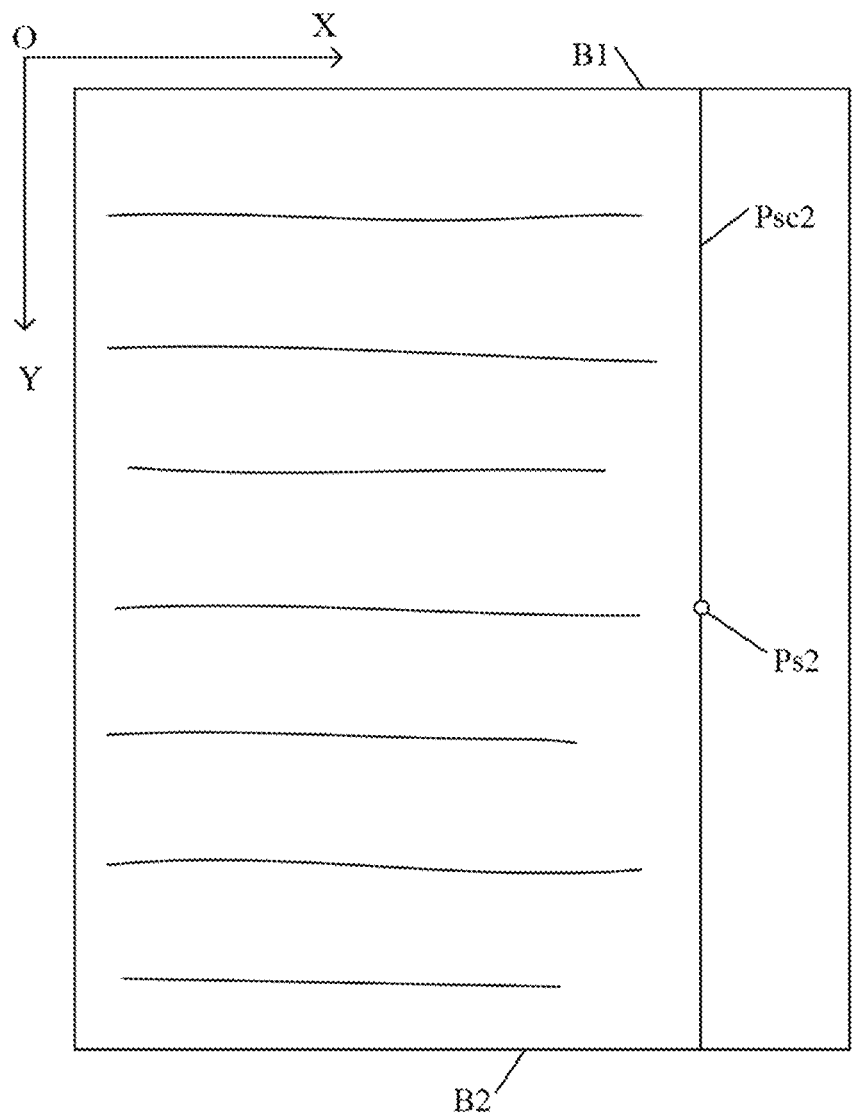
FIG. 7A is still another schematic view of an intermediate corrected image provided by at least one embodiment of the present disclosure.
Figure 7B:
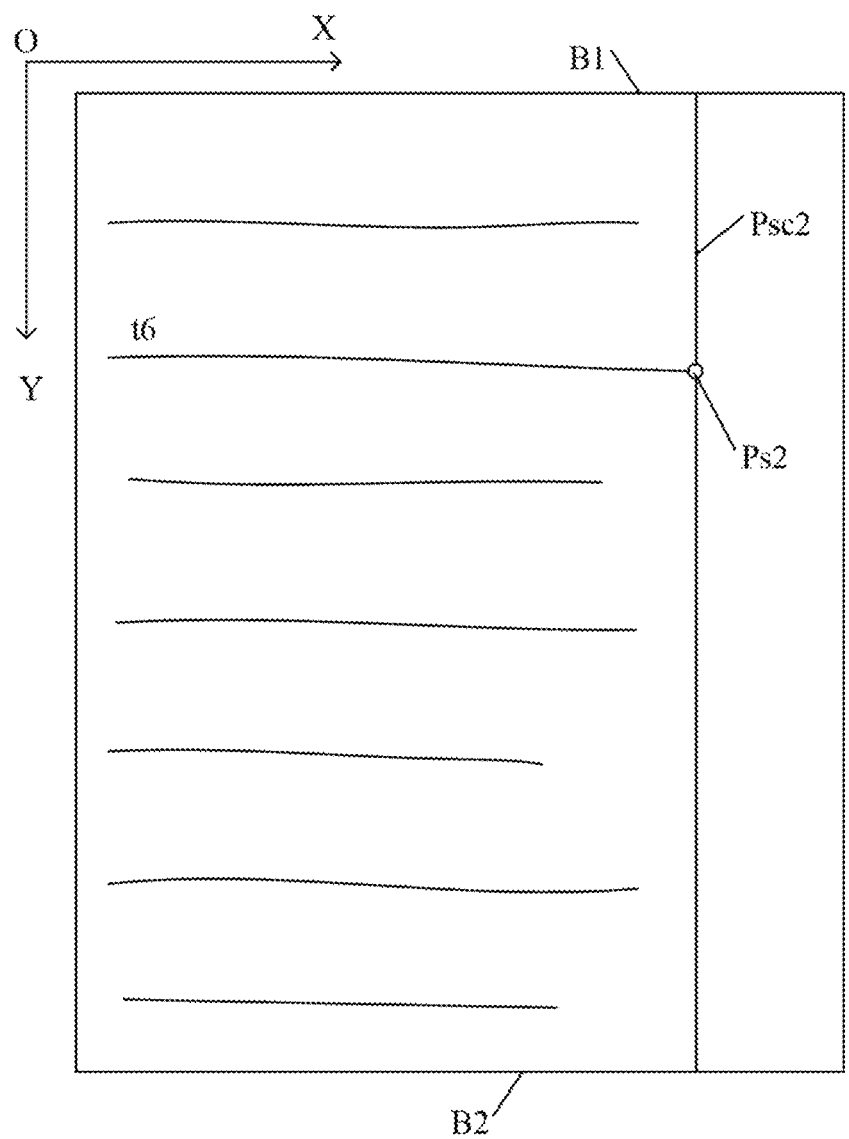
FIG. 7B is yet another schematic view of another intermediate corrected image provided by at least one embodiment of the present disclosure.
Figure 7C:
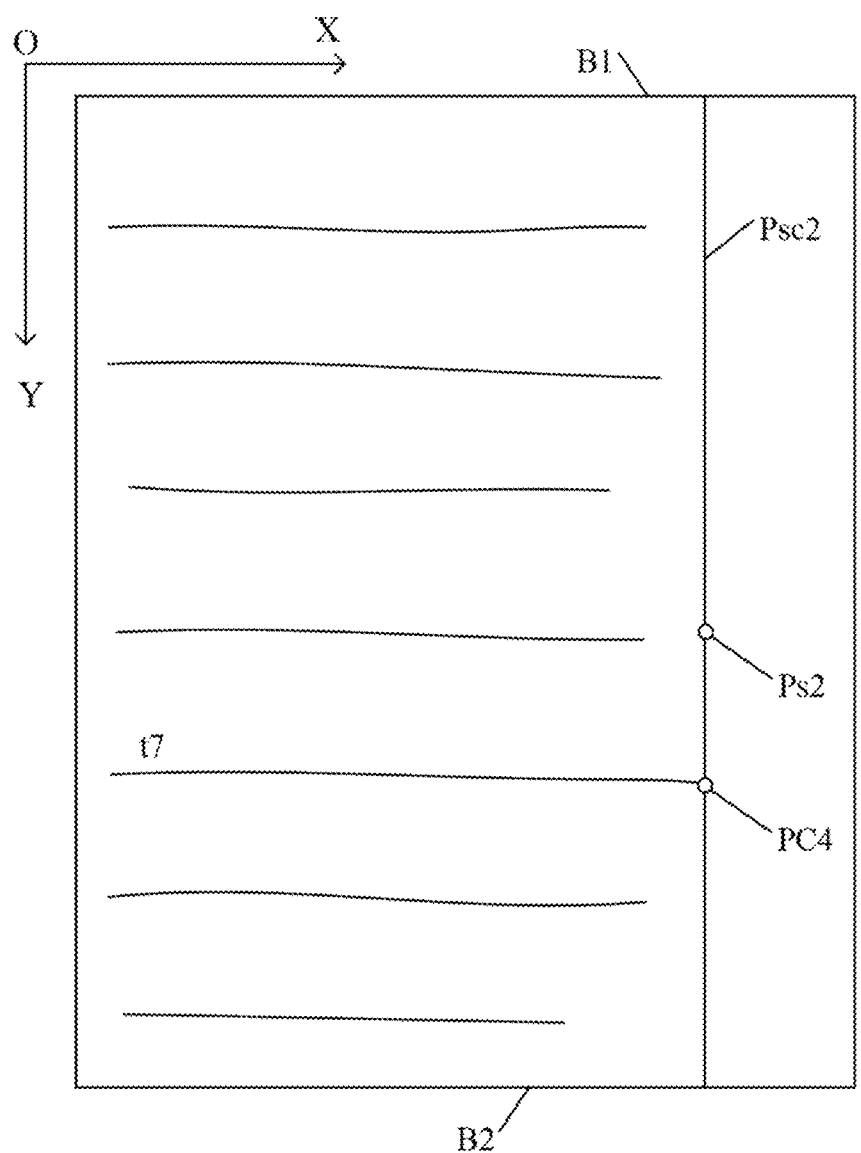
FIG. 7C is still another schematic view of yet another intermediate corrected image provided by at least one embodiment of the present disclosure.

FIG. 7A is still another schematic view of an intermediate corrected image provided by at least one embodiment of the present disclosure. FIG. 7B is yet another schematic view of another intermediate corrected image provided by at least one embodiment of the present disclosure. FIG. 7C is still another schematic view of yet another intermediate corrected image provided by at least one embodiment of the present disclosure.

For example, in some embodiments, in step S122, the step of determining the relative offsets of the remaining pixels outside the M character row lower boundaries in the intermediate corrected image and the reference pixels on the M character row lower boundaries according to the relative offset of all pixels on the M character row lower boundaries other than the reference pixels on the M character row lower boundaries, the first image boundary and the second image boundary includes: obtaining the second selected pixel and determining the second selected pixel column where the second selected pixel is located; in response to that all pixels on the second selected pixel column do not intersect any character row lower boundary in the M character row lower boundaries, or in response to that there is an intersection pixel between the second selected pixel column and the lower boundary of any character row in the M character row lower boundaries, and the intersection pixel between the second selected pixel column and any character row lower boundary is the reference pixel on any character row lower boundary, the relative offsets of all pixels on the second selected pixel column are determined the predetermined value.

For example, as shown in FIG. 7A to FIG. 7C, the second selected pixel column Psc2 where the second selected pixel Ps2 is located extends along the first direction (i.e., the Y-axis direction), as shown in FIG. 7A, and the second selected pixel Ps2 is not located on the M character row lower boundaries, or, as shown in FIG. 7B, the second selected pixel Ps2 is a reference pixel on a character row lower boundary in the M character row lower boundaries, for example, a reference pixel on the character row lower boundary t6.

For example, as shown in FIG. 7A, in the case that all pixels on the second selected pixel column Psc2 do not intersect any character row lower boundary in the M character row lower boundaries, the relative offsets of all pixels on the second selected pixel column Psc2 are determined as the predetermined value.

For example, as shown in FIG. 7C, there is an intersection pixel PC4 between the second selected pixel column Psc2 and any character row lower boundary (for example, character row lower boundary t7) on the M character row lower boundaries, and the intersection pixel PC4 between the second selected pixel column Psc2 and any character row lower boundary is the reference pixel of any character row lower boundary, and the relative offsets of all pixels on the second selected pixel column Psc2 are determined as the predetermined value. In other words, the second selected pixel column Psc2 may include one reference pixel or multiple reference pixels, or may not include reference pixels.

It should be noted that the second selected pixel Ps2 may also be located on the third image boundary B3, or may also be located on the fourth image boundary opposite to the third image boundary B3 (for example, the fourth image boundary may be the boundary on the left side of the intermediate corrected image 45 shown in FIG. 4E). That is, the relative offsets of all pixels on the third image boundary B3 and the fourth image boundary are predetermined values.

For example, as shown in FIG. 2, in step S123: The local adjustment offsets of all pixels on the local adjustment reference line are set as the predetermined value.

For example, in some embodiments of the present disclosure, the local adjustment offsets of all pixels on the local adjustment reference line are the same and are set as the predetermined value, for example, 0. According to actual requirements, the local adjustment offsets of all pixels on the local adjustment reference line may also be other suitable values, and the embodiments of the present disclosure provide no limitation to the local adjustment offsets of all pixels on the local adjustment reference line.

Figure 8A:
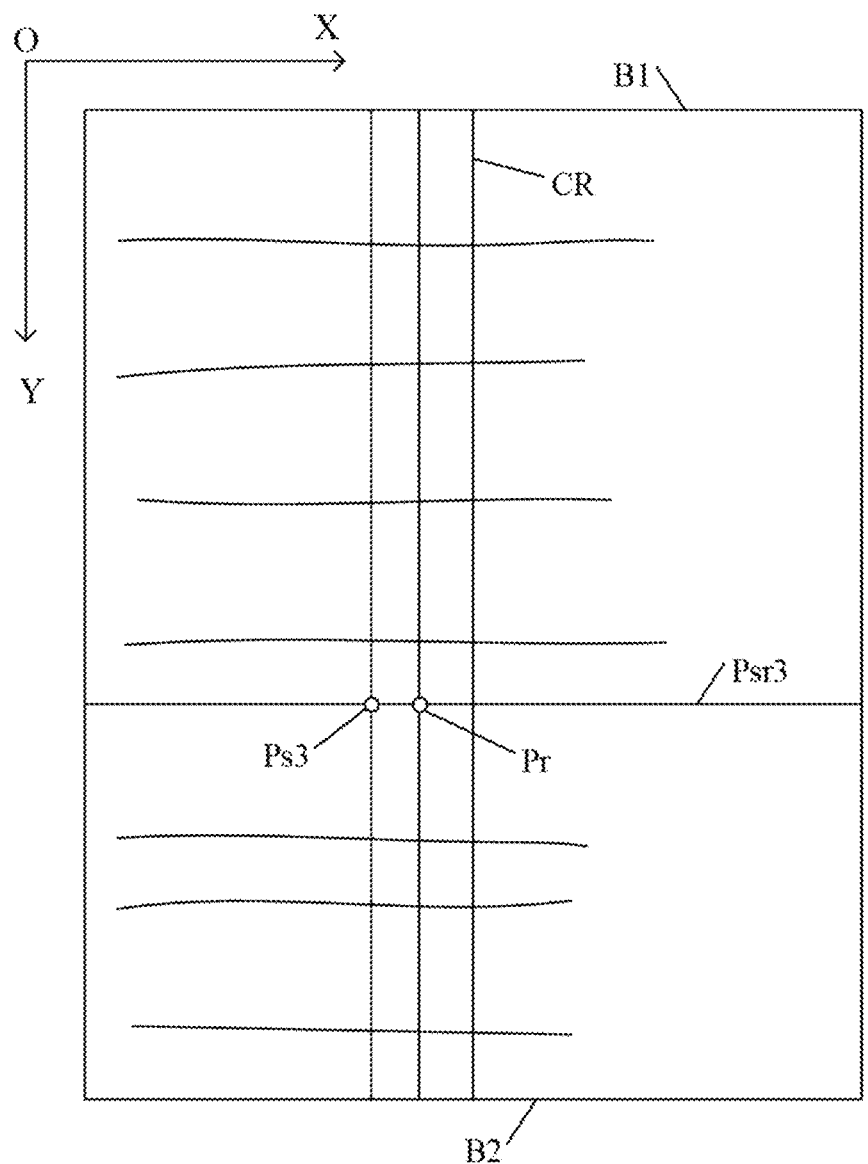
FIG. 8A is yet another schematic view of an intermediate corrected image provided by at least one embodiment of the present disclosure.
Figure 8B:
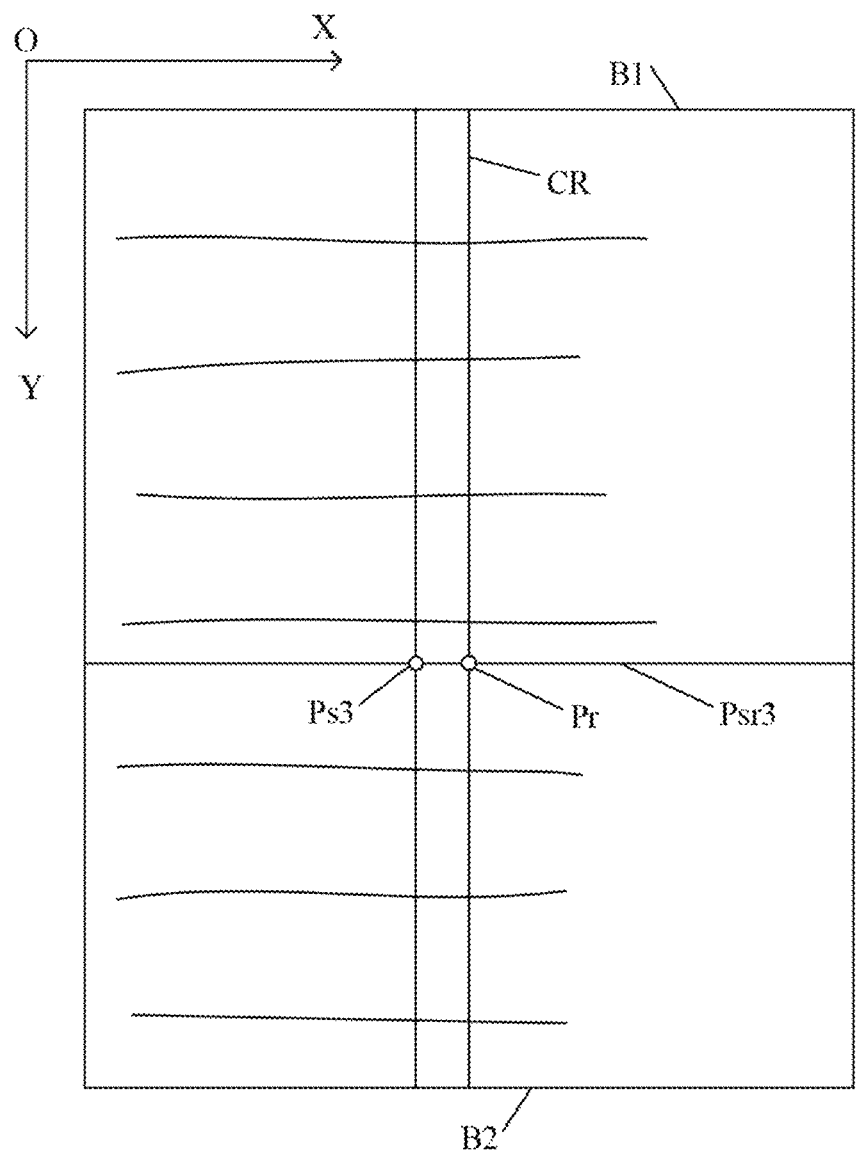
FIG. 8B is still another schematic view of another intermediate corrected image provided by at least one embodiment of the present disclosure.
Figure 8C:
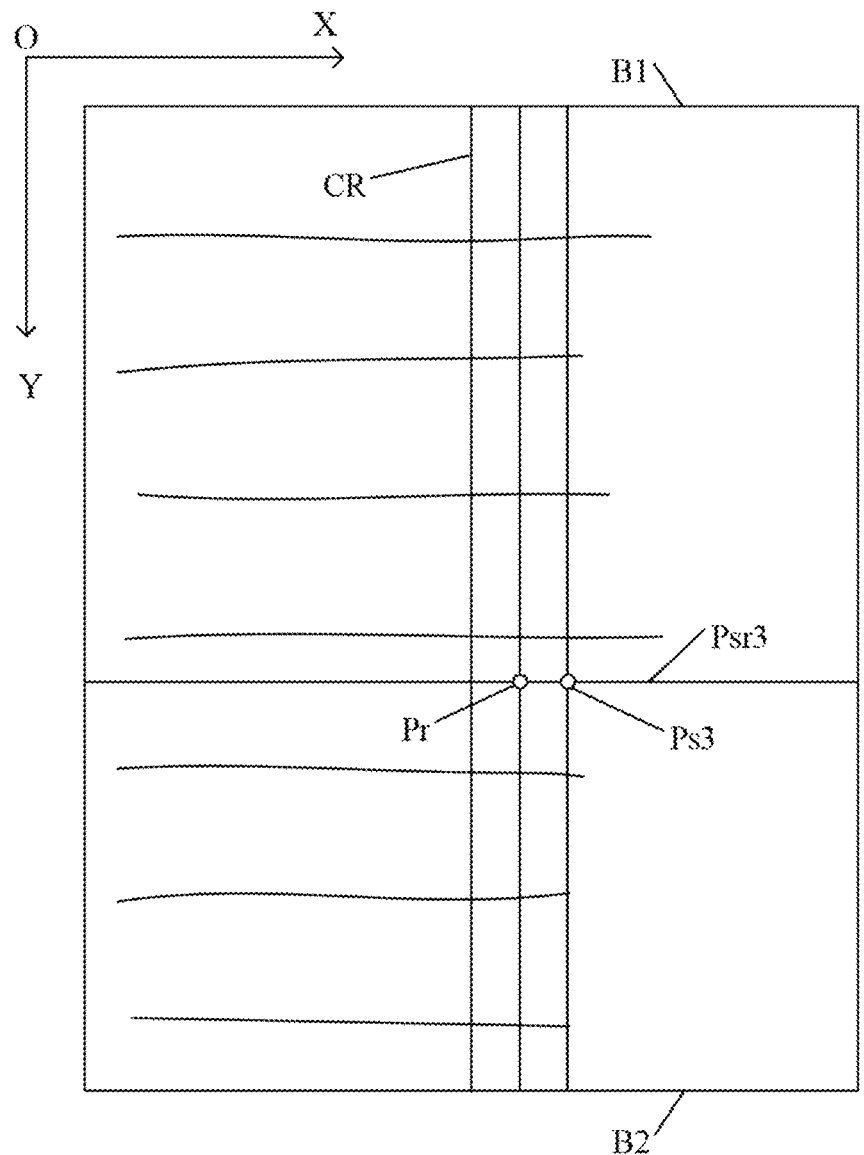
FIG. 8C is still another schematic view of still another intermediate corrected image provided by at least one embodiment of the present disclosure.

FIG. 8A is yet another schematic view of an intermediate corrected image provided by at least one embodiment of the present disclosure. FIG. 8B is still another schematic view of another intermediate corrected image provided by at least one embodiment of the present disclosure. FIG. 8C is still another schematic view of still another intermediate corrected image provided by at least one embodiment of the present disclosure.

For example, as shown in FIG. 2, in step S124: According to the local adjustment offsets of all pixels on the local adjustment reference line and the relative offsets corresponding to all pixels in the intermediate corrected image, the local adjustment offsets of all pixels outside the local adjustment reference line in the intermediate corrected image are determined.

For example, step S124 may include: obtaining the third selected pixel, wherein the third selected pixel is not located on the local adjustment reference line; determining the pixel row where the third selected pixel is located, and obtaining the pixel adjacent to the third selected pixel on the pixel row and using the pixel as the reference pixel, wherein the reference pixel is located on one side of the third selected pixel close to the local adjustment reference line or on the local adjustment reference line; determining the local adjustment offset of the reference pixel; determining the local adjustment offset of the third selected pixel according to the local adjustment offset of the reference pixel and the relative offset of the third selected pixel. The above operations are performed respectively on all pixels in the intermediate corrected image to determine the local adjustment offset of all pixels in the intermediate corrected image.

When determining the local adjustment offset of each pixel in the intermediate corrected image, the local adjustment offsets of all pixels on the local adjustment reference line are set as a predetermined value (0), and then the local adjustment offset of each pixel is calculated accumulatively in sequence from the local adjustment reference line to the left side and right side respectively, thereby obtaining the local adjustment offsets of all pixels in the intermediate corrected image.

For example, the reference pixel Pr and the third selected pixel Ps3 are located in the same pixel row, as shown in FIG. 8A to FIG. 8C, the pixel row where the third selected pixel Ps3 is located is the pixel row Psr3, and the pixel adjacent to the third selected pixel Ps3 on the pixel row Psr3 is obtained and serves as the reference pixel Pr.

It should be noted that the third selected pixel Ps3 can be located on the character row lower boundary or not on the character row lower boundary.

For example, as shown in FIG. 8A, the reference pixel Pr is located on one side of the third selected pixel Psr3 close to the local adjustment reference line CR, that is, in the X-axis direction. The reference pixel Pr is located between the third selected pixel Psr3 and the local adjustment reference line CR. In FIG. 8A, the reference pixel Pr and the third selected pixel Ps3 are located on the left side of the local adjustment reference line CR; in FIG. 8C, the reference pixel Pr and the third selected pixel Ps3 are located on the right side of the local adjustment reference line CR.

For example, as shown in FIG. 8B, the third selected pixel Ps3 is located on the left side of the local adjustment reference line CR, and the reference pixel Pr is located on the local adjustment reference line CR, that is, the reference pixel Pr is a pixel on the local adjustment reference line CR. In still another example, the third selected pixel Ps3 is located on the right side of the local adjustment reference line CR, and the reference pixel Pr is located on the local adjustment reference line CR.

For example, in step S124, the step of determining the local adjustment offset of the reference pixel includes: when the reference pixel is located on the local adjustment reference line CR, determining that the local adjustment offset of the reference pixel as a predetermined value; when the reference pixel is not located on the local adjustment reference line CR, determining the local adjustment offset of the reference pixel according to the method of determining the local adjustment offset of the third selected pixel, and so on.

For example, in step S124, the step of determining the local adjustment offset of the third selected pixel according to the local adjustment offset of the reference pixel and the relative offset of the third selected pixel includes: in response to the third selected pixel being located on the first side of the local adjustment reference line, the local adjustment offset of the third selected pixel is expressed as:

$$dyt=dyc+ddyt$$

In response to the third selected pixel being located on the second side of the local adjustment reference line, the local adjustment offset of the third selected pixel is expressed as:

$$dyt=dyc-ddyt$$

In the equation, dyt represents the local adjustment offset of the third selected pixel, dyc represents the local adjustment offset of the reference pixel, and ddyt represents the relative offset of the third selected pixel. Here, the calculation process of the relative offset can be derived from the related description provided in the foregoing embodiment, in which the relative offset of each pixel on the character row lower boundary indicates the Y-axis coordinate value of the pixel minus the Y-axis coordinate value of the pixel located on the pixel column adjacent to the right side of the pixel column where the pixel is located and on the same character row lower boundary as the pixel. No further description is incorporated herein.

For example, the first side is the left side of the local adjustment reference line CR, and the second side is the right side of the local adjustment reference line CR.

That is, in the embodiment of the present disclosure, under the condition that the relative offset of each pixel on the character row lower boundary in the intermediate corrected image indicates the Y-axis coordinate value of the pixel minus the Y-axis coordinate value of the pixel located on the pixel column adjacent to the right side of the pixel column where the pixel is located and on the same character row lower boundary as the pixel, the local adjustment offset of each pixel located on the left side of the local adjustment reference line CR is the local adjustment offset of the pixel adjacent to the right side of the pixel plus the relative offset of the pixel; and the local adjustment offset of each pixel located on the right side of the local adjustment reference line CR is the local adjustment offset of the pixel adjacent to the left side of the pixel minus the relative offset of the pixel.

For example, the relative offset of each pixel on the character row lower boundary is expressed as:

$$ddy(x1,y1)=y(x1,y1)-y(x1+1,y1')$$

In the equation, ddy(x1, y1) represents the relative offset of the pixel located at (x1, y1) in the first coordinate system, y(x1, y1) represents the Y-axis coordinate value of the pixel located at (x1, y1) in the first coordinate system, and y(x1+1, y1') represents the Y-axis coordinate value of the pixel located at (x1+1, y1') in the first coordinate system. The pixel column where the pixel located at (x1, y1) in the first coordinate system is located is adjacent to the pixel column where the pixel located at (x1+1, y1') in the first coordinate system is located, and the pixel located at (x1, y1) in the first coordinate system and the pixel located at (x1+1, y1') in the first coordinate system are located on the same character row lower boundary. The relative offset of the intermediate corrected image except for the pixel on the character row lower boundary can be obtained by interpolation.

Then, when the pixel located at (x2, y2) in the first coordinate system and the pixel located at (x2+1, y2) in the first coordinate system are both on the left side of the local adjustment reference line CR, the local adjustment offset of the pixel on the left side of the local adjustment reference line CR is expressed as:

$$dy(x2,y2)=dy(x2+1,y2)+ddy(x2,y2)$$

When the pixel located at (x2, y2) in the first coordinate system and the pixel located at (x2+1, y2) in the first coordinate system are both on the right side of the local adjustment reference line CR, the local adjustment offset of the pixel located on the right side of the local adjustment reference line CR is expressed as:

$$dy(x2+1,y2)=dy(x2,y2)-ddy(x2+1,y2)$$

In the equation, dy(x2, y2) represents the local adjustment offset of the pixel located at (x2, y2) in the first coordinate system, dy(x2+1, y2) represents the local adjustment offset of the pixel located at (x2+1, y2) in the first coordinate system, ddy(x2+1, y2) represents the relative offset of the pixel located at (x2+1, y2) in the first coordinate system, and ddy(x2, y2) represents the relative offset of the pixel located at (x2, y2) in the first coordinate system. The pixel located at (x2, y2) in the first coordinate system is adjacent to the pixel located at (x2+1, y2) in the first coordinate system and they are located on the same pixel row.

For example, as shown in FIG. 2, in step S125: Local adjustment is performed on the intermediate corrected image according to the local adjustment offsets of all pixels outside the local adjustment reference line in the intermediate corrected image and the local adjustment offsets of all pixels on the local adjustment reference line, so as obtain the target corrected image.

It should be noted that the number and types of characters in the input image, the characters in the intermediate corrected image, and the characters in the target corrected image are the same. The difference between them is: there may be differences in the absolute positions of the characters in the input image, the characters in the intermediate corrected image, and the characters in the target corrected image. However, the relative position of each character can remain unchanged, that is, two characters that are adjacent to each other in the input image are still adjacent to each other in the intermediate corrected image and the target corrected image.

For example, global correction is used to correct the overall shape of all characters in the input image. In some embodiments, global correction can be implemented using algorithms in opencv based on the concept of Leptonica (Leptonica is an open source image processing and image analysis library). In other embodiments, global correction can also be implemented through machine learning (for example, neural network).

Figure 9A:
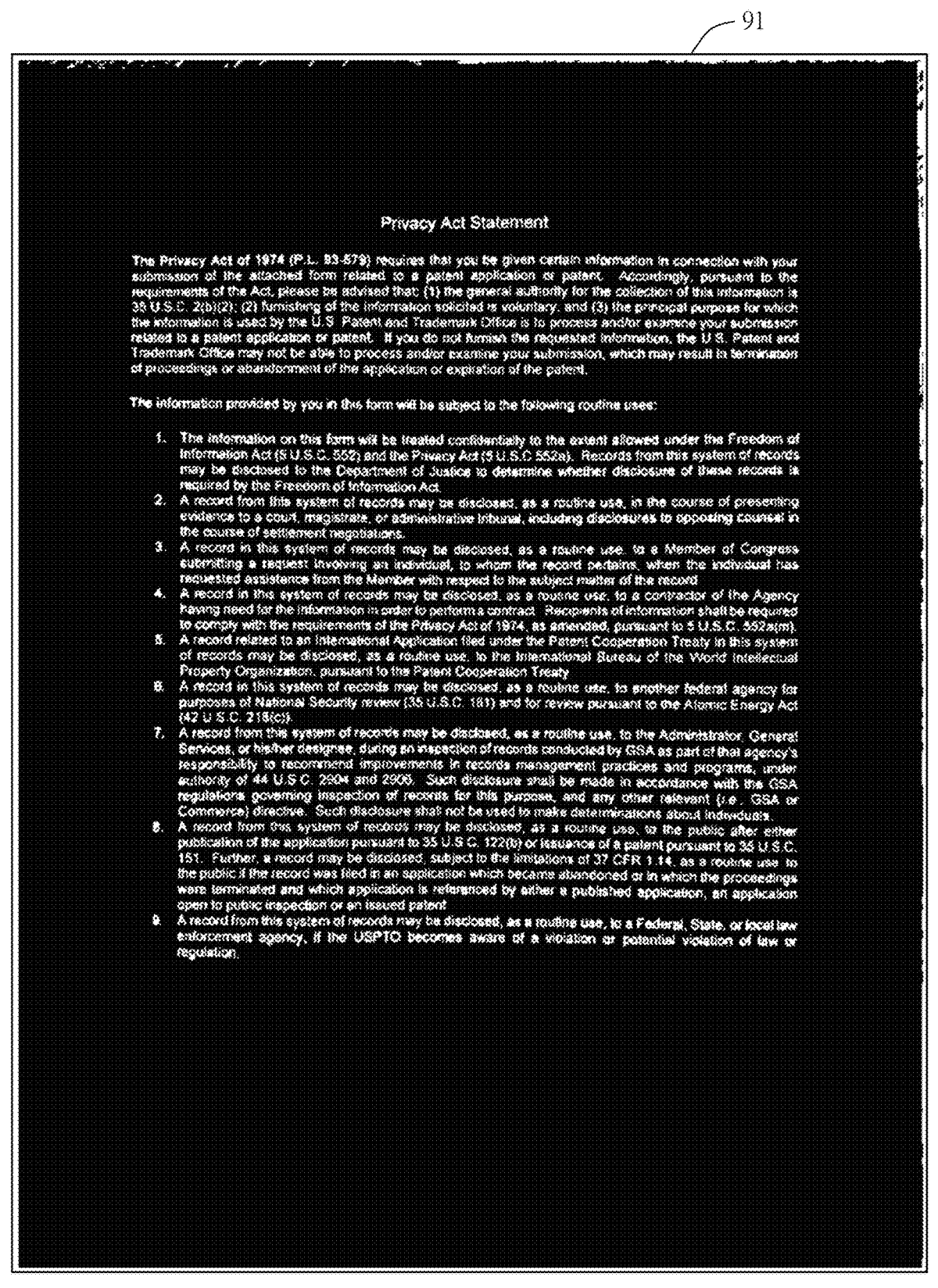
Figure 9B:
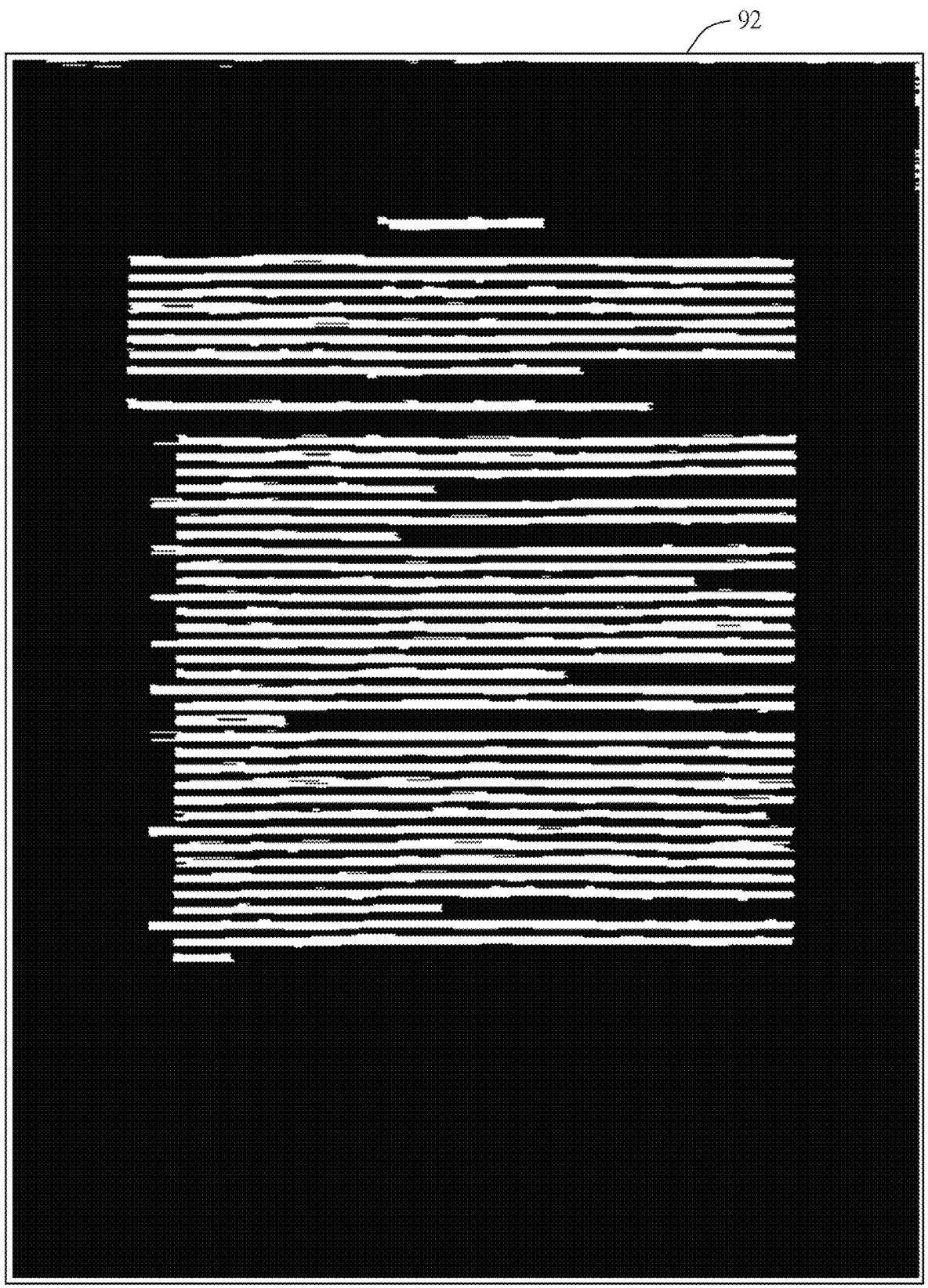
FIG. 9B is a schematic view of a connected image of input characters provided by some embodiments of the present disclosure.
Figure 10A:
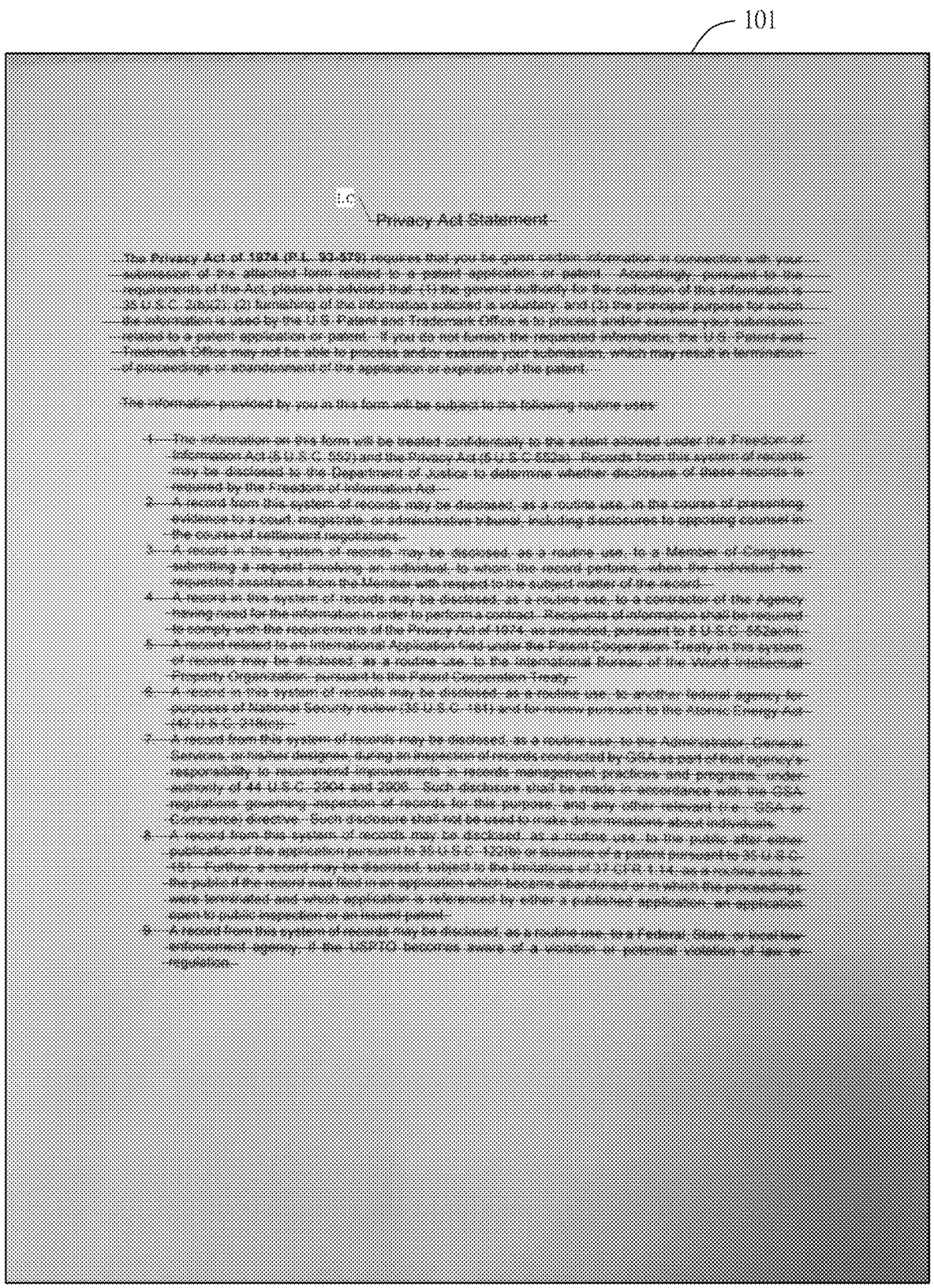
FIG. 10A is a schematic view of an input image showing M middle lines provided by some embodiments of the present disclosure.
Figure 10B:
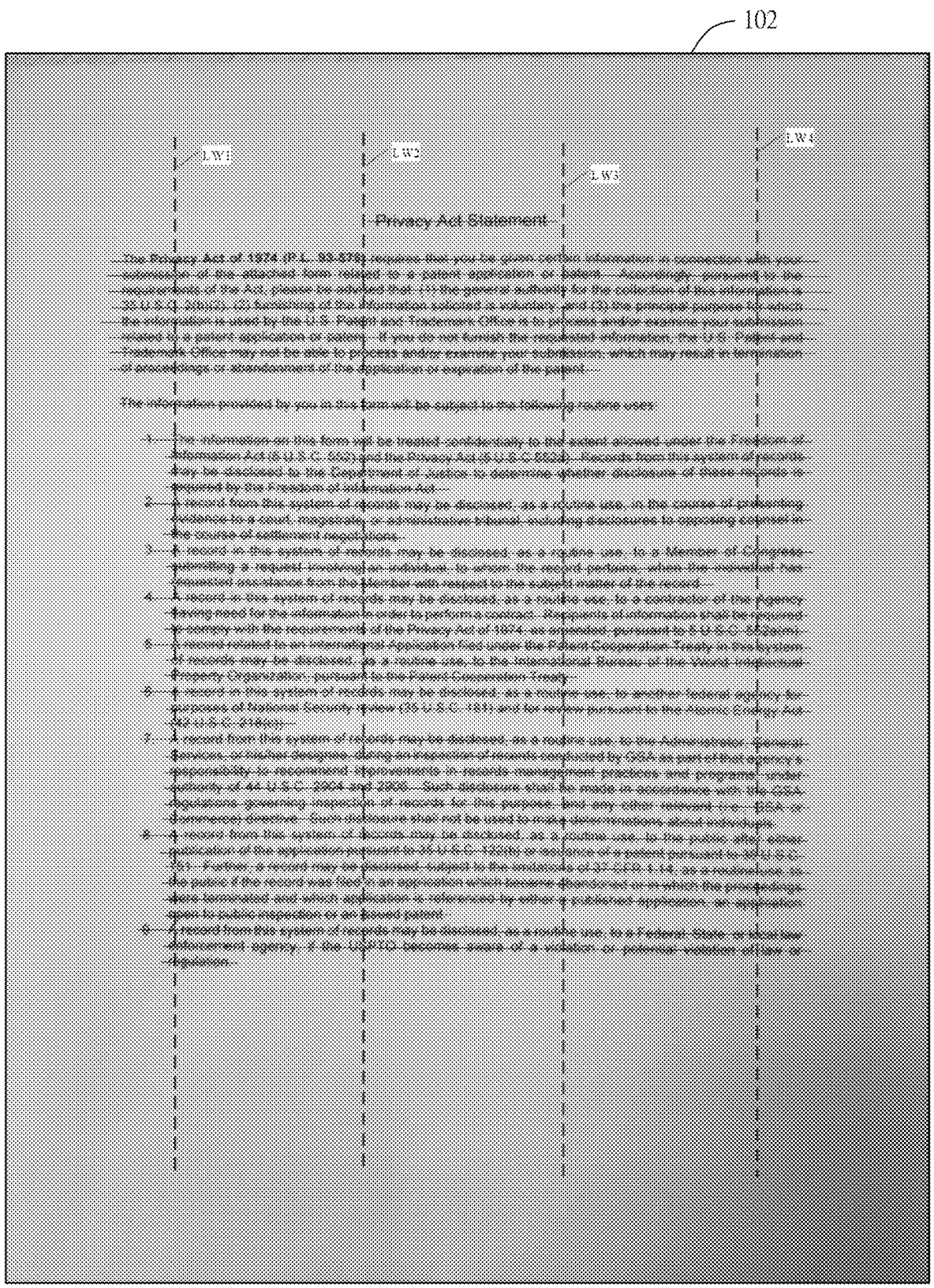
FIG. 10B is a schematic view of an input image showing W first division lines provided by some embodiments of the present disclosure.
Figure 10C:
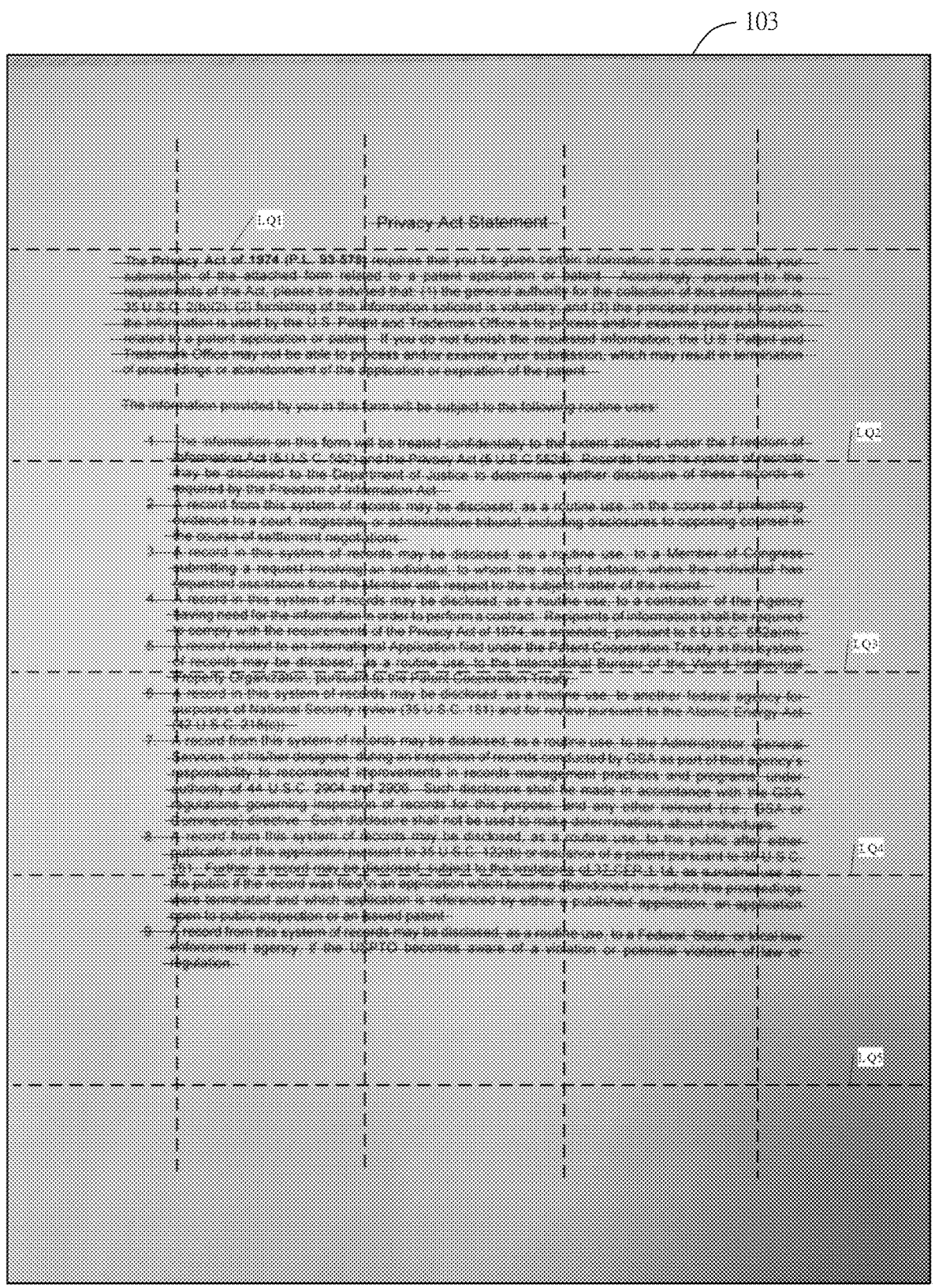
FIG. 10C is a schematic view of an input image showing Q second division lines provided by some embodiments of the present disclosure.

FIG. 9A is a schematic view of a binarized image of an input image provided by some embodiments of the present disclosure. FIG. 9B is a schematic view of a connected image of input characters provided by some embodiments of the present disclosure. FIG. 10A is a schematic view of an input image showing M middle lines provided by some embodiments of the present disclosure. FIG. 10B is a schematic view of an input image showing W first division lines provided by some embodiments of the present disclosure. FIG. 10C is a schematic view of an input image showing Q second division lines provided by some embodiments of the present disclosure.

For example, in some embodiments, step S11 may include: performing binarization processing on the input image to obtain a binarized image of the input image; performing character connection processing on the binarized image to obtain input character connected image, wherein the input character connected image includes M input character connected areas corresponding to M character rows; obtaining M middle lines corresponding to the M input character connected areas one-to-one, wherein the M input character connected areas are arranged along the first direction; setting W first division lines; obtaining multiple intersections between the M middle lines and W first division lines as multiple third intersection pixels; performing quadratic fitting based on the multiple third intersection pixels to obtain W quadratic functions corresponding to the W first division lines one-to-one; setting Q second division lines; obtaining multiple intersections between the W first division lines and the Q second division lines as multiple fourth intersection pixels; calculating the global adjustment offset of the multiple fourth intersection pixels based on the W quadratic functions; performing global correction processing on the input image according to the global adjustment offset of the multiple fourth intersection pixels, so as to obtain the intermediate corrected image.

For example, the binarization process is to set the gray value of the pixel on the input image to 0 or 255, that is, to present the entire input image with a clear black and white effect. In step S120, the binarization process is reversed binarization processing, as shown in FIG. 9A, in the binarized image 91 of the input image, the gray value of the pixel corresponding to the character is 255, and the gray value of the pixel corresponding to the background is 0, that is, the character is white, and the background is black.

For example, the method of binarization may include threshold method, bimodal method, P-parameter method, big law (OTSU method), maximum entropy method, iterative algorithm, and so on.

For example, the method of performing character connection processing on a binarized image is the same as the method of performing character connection processing on an intermediate corrected image described above, and no further description will be incorporated herein. For example, the input character connected image 92 shown in FIG. 9B is an image obtained by performing character connection processing on the binarized image 91 of the input image shown in FIG. 9A.

For example, in step S11, the step of performing quadratic fitting based on a plurality of third intersection pixels to obtain W quadratic functions corresponding to the W first division lines one-to-one includes: determining the second coordinate system based on the input image; determining the coordinate values of the multiple character center points corresponding to the multiple third intersection pixels in the second coordinate system; calculating the global adjustment offset of the multiple third intersection pixels based on the multiple character center points; performing quadratic fitting on the global adjustment offset of the multiple third intersection pixels to obtain W quadratic functions corresponding to the W first division lines one-to-one.

For example, the second coordinate system determined by the input image may be the second coordinate system OXY shown in FIG. 3.

For example, in some embodiments, W may be 30, and Q may also be 30.

For example, the W first division lines extend in the first direction, the Q second division lines extend in the second direction, and the first direction and the second direction are perpendicular to each other. For example, the second coordinate system OXY includes an X-axis and a Y-axis, the first direction may be parallel to the X-axis of the coordinate system, and the second direction may be parallel to the Y-axis of the coordinate system. For example, as shown in the input image 101 in FIG. 10A, LC represents the middle line corresponding to the input character connected area. The input image 102 shown in FIG. 10B shows four first division lines LW1~LW4, and the input image 103 shown in FIG. 10C shows five second division lines LQ1~LQ5.

For example, as shown in FIG. 10B, each first division line intersects at least one of the M middle lines LC, so that a plurality of third intersection pixels corresponding to the first division lines are determined. It should be noted that because some of the middle lines are short, the first division lines do not necessarily intersect with the M middle lines LC. For example, the first division lines LW4 on the rightmost side shown in FIG. 10B do not intersect the middle line corresponding to the input character connected area (the input character connected area includes the characters "The", "information", "provided", "by", "you", "in", "this", "form", "will" etc.) located in the tenth row.

For example, the M middle lines LC may be straight lines or curved lines.

For example, for each third intersection pixel among the plurality of third intersection pixels, the deviation of each third intersection pixel in the Y-axis direction is calculated and serves as the global adjustment offset of the third intersection pixel. That is, the global adjustment offset of the third intersection pixel includes the difference between the Y-axis coordinate value of the third intersection pixel in the second coordinate system and the Y-axis coordinate value of the character center point corresponding to the third intersection pixel in the second coordinate system (difference is the Y-axis coordinate value of the third intersection pixel in the second coordinate system minus the Y-axis coordinate value of the character center point corresponding to the third intersection pixel in the second coordinate system). For example, the character center point represents the center point of the character row where the third intersection pixel is located.

For example, each second division line intersects with W first division lines, thereby determining a plurality of fourth intersection pixels corresponding to the second division lines. As shown in FIG. 10C, each second division line intersects with four first division lines LW1~LW4. For each fourth intersection pixel among the plurality of fourth intersection pixels, the global adjustment offset of the fourth intersection pixel includes the offset of the fourth intersection pixel in the Y-axis direction in the second coordinate system.

For example, based on W quadratic functions, the step of calculating the global adjustment offset of multiple fourth intersection pixels includes: calculating the global adjustment offset of the multiple fourth intersection pixels between the first division lines and the Q second division lines according to the quadratic function corresponding to the first division lines. For example, as shown in FIG. 10B and FIG. 10C, based on the quadratic function corresponding to the first division lines LW1, the global adjustment offset of the five fourth intersection pixels between the first division lines LW1 and the five second division lines LQ1~LQ5 can be calculated.

For example, if multiple fourth intersection pixels are arranged as an intersection matrix of W*Q, a grid formed by a group of multiple fourth intersection pixels is obtained. For example, when W and Q are both 30, the grid is a grid composed of 900 (30*30) fourth intersection pixels.

For example, in some embodiments, the step of performing global correction processing on the input image to obtain an intermediate corrected image according to the global adjustment offset of the multiple fourth intersection pixels includes: performing quadratic fitting on the global adjustment offset of the multiple fourth intersection pixels to obtain the global displacement adjustment function; obtaining the global adjustment offset of each pixel in the input image according to the global displacement adjustment function; performing global correction processing on the input image based on the image interpolation algorithm according to the global adjustment offset of each pixel in the input image, thereby obtaining the intermediate corrected image.

For example, the image interpolation algorithms include nearest-neighbor, bilinear, bicubic and other algorithms.

For example, in some embodiments, the step of performing global correction processing on the input image to obtain an intermediate corrected image includes: performing global correction processing on the binarized image of the input image to obtain the binarized intermediate corrected image. The binarized intermediate corrected image is the final intermediate corrected image.

It should be noted that in other embodiments, the step of performing global correction processing on the binarized image to obtain the intermediate corrected image includes: first, global correction processing is performed on the input image to obtain a grayscale or color intermediate corrected image, and the grayscale or color intermediate corrected image is the final intermediate corrected image.

Figure 11A:
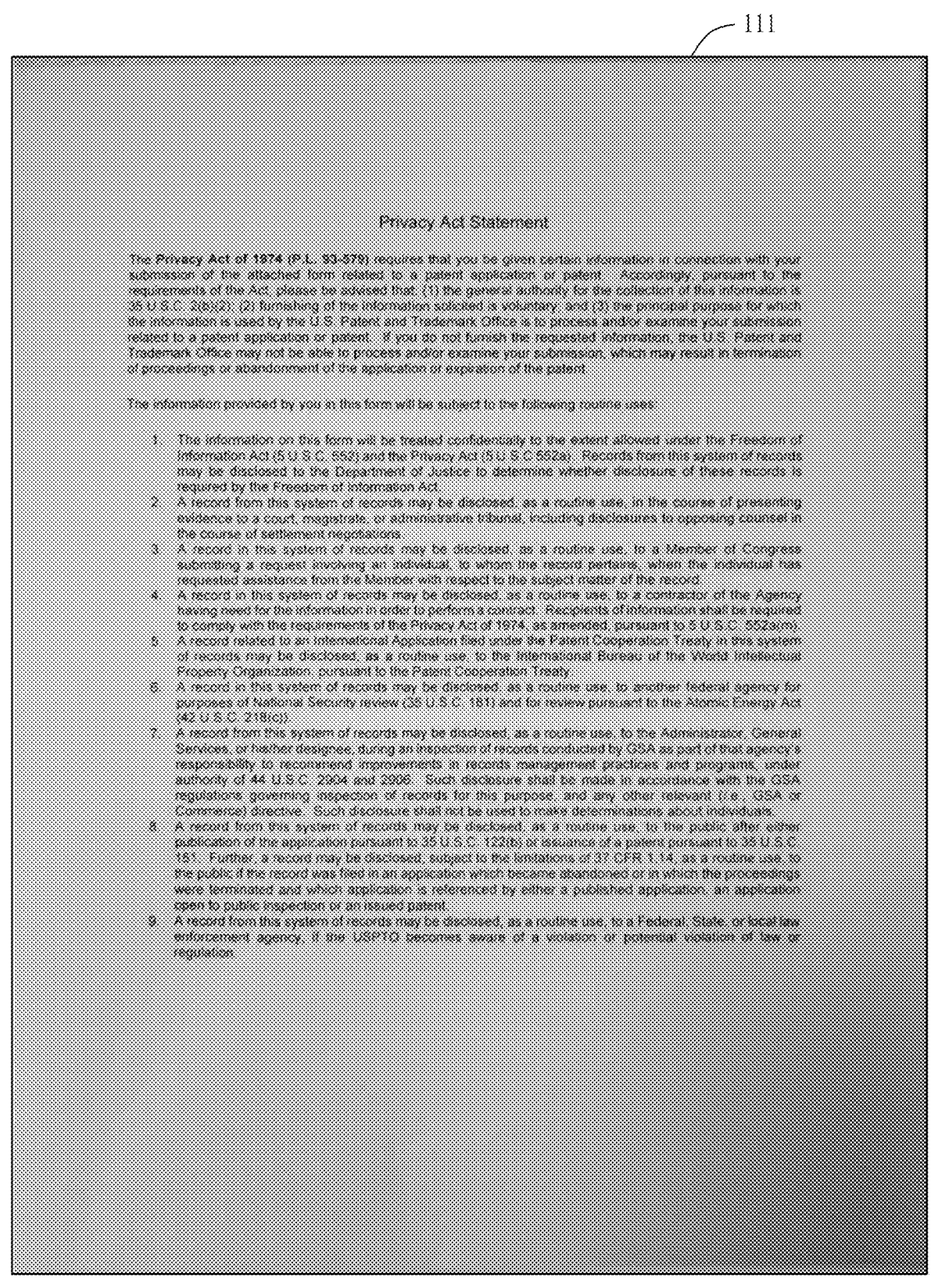

FIG. 11A is a schematic view of a target corrected image provided by some embodiments of the present disclosure.

For example, the target corrected image 111 shown in FIG. 11A is an image obtained by sequentially performing global correction and local correction on the input image 31 shown in FIG. 3. As shown in FIG. 11A, after processing the input image according to the processing method provided by the embodiment of the present disclosure, the characters in the character row are arranged in a row along the horizontal direction, and the character row lower boundary corresponding to the character row is roughly a straight line, and the straight line is approximately parallel to the horizontal direction.

Figure 11B:
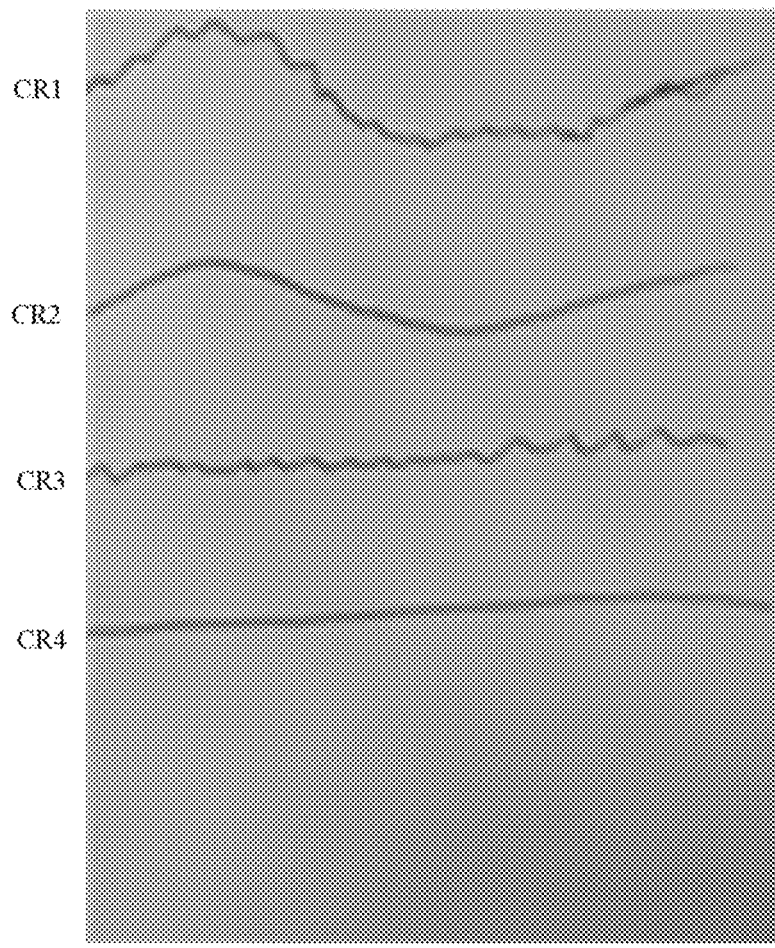
FIG. 11B is a schematic view showing a global correction and a local correction provided by some embodiments of the present disclosure.

For example, as shown in FIG. 11B, the first curve CR1 can represent the deviation of a character row; the second curve CR2 can represent the deviation captured by the global correction; the third curve CR3 can represent the result of the global correction. After the global correction, there are still details that have not been adjusted. The third curve CR3 can represent the details neglected in the global correction; the fourth curve CR4 can represent the result of the global correction plus the local correction.

Figure 12:
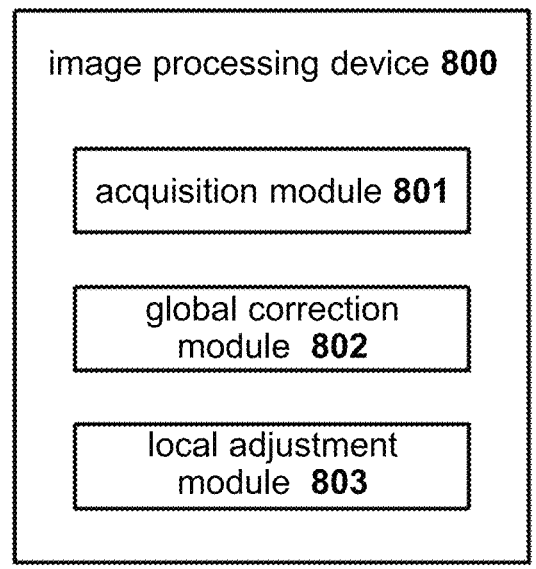
FIG. 12 is a schematic block view of an image processing device provided by at least one embodiment of the present disclosure.

At least one embodiment of the present disclosure further provides an image processing device. FIG. 12 is a schematic block view of an image processing device provided by at least one embodiment of the present disclosure.

For example, as shown in FIG. 12, the image processing device 800 includes an acquisition module 801, a global correction module 802, and a local adjustment module 803.

For example, the acquisition module 801 is used for obtaining an input image. The input image includes M character rows, each character row in the M character rows includes at least one character, the M character rows are arranged in the first direction, and M is a positive integer.

The global correction module 802 is configured to perform global correction processing on the input image to obtain an intermediate corrected image.

The local adjustment module 803 is configured to make local adjustments to the intermediate corrected image to obtain the target corrected image.

For example, the acquisition module 801, the global calibration module 802, and/or the local adjustment module 803 include codes and programs stored in memory. The processor can execute the codes and programs to realize some or all of the functions of the acquisition module 801, the global correction module 802 and/or the local adjustment module 803 described above. For example, the acquisition module 801, the global correction module 802, and/or the local adjustment module 803 may be special hardware devices to implement some or all of the functions of the acquisition module 801, the global correction module 802, and/or the local adjustment module 803 described above. For example, the acquisition module 801, the global correction module 802, and/or the local adjustment module 803 may be one circuit board or a combination of multiple circuit boards to implement the above-mentioned functions. In the embodiment of the present disclosure, the one circuit board or the combination of multiple circuit boards may include: (1) one or more processors; (2) one or more non-transitory memories connected to the processors; and (3) the firmware stored in the memory executable by the processor.

It should be noted that the acquisition module 801 is configured to implement the step S10 shown in FIG. 1, the global correction module 802 is configured to implement the step S11 shown in FIG. 1, and the local adjustment module 803 is configured to implement the step S12 shown in FIG. 1. Therefore, for the specific description of the functions implemented by the acquisition module 801, please refer to the related description of step S10 shown in FIG. 1 in the embodiment of the image processing method, and for the specific description of the functions implemented by the global correction module 802, please refer to the related description of step S11 shown in FIG. 1 in the embodiment of the image processing method, for the specific description of the functions implemented by the local adjustment module 803, please refer to the related description of step S12 shown in FIG. 1 in the embodiment of the image processing method. In addition, the image processing device can achieve similar technical effects as the aforementioned image processing method, and no further description is incorporated herein.

Figure 13:
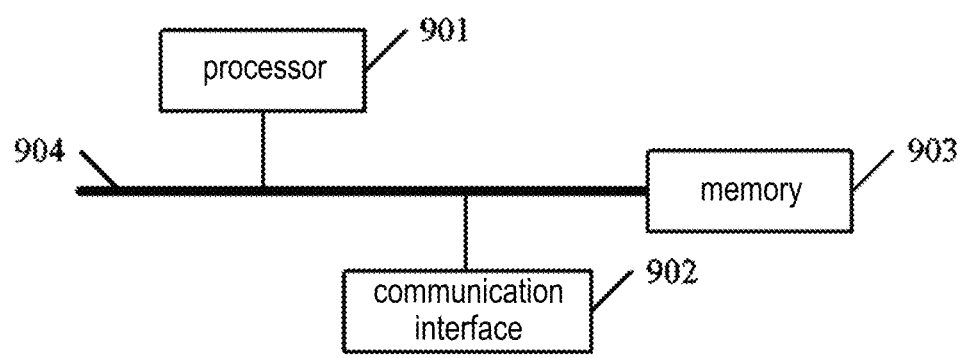
FIG. 13 is a schematic block view of an electronic device provided by at least one embodiment of the present disclosure.

At least one embodiment of the present disclosure further provides an electronic device. FIG. 13 is a schematic block view of an electronic device provided by at least one embodiment of the present disclosure.

For example, as shown in FIG. 13, the electronic device includes a processor 901, a communication interface 902, a memory 903, and a communication bus 904. The processor 901, the communication interface 902, and the memory 903 communicate with each other through the communication bus 904, and the processor 901, the communication interface 902, the memory 903 and other components can also communicate through a network connection. The present disclosure provides no limitation to the types and functions of the network here.

For example, the memory 903 is configured for storing computer-readable instructions non-temporarily. The processor 901 is configured to implement the image processing method described in any one of the foregoing embodiments when executing computer-readable instructions. For the specific implementation of each step of the image processing method and related description, please refer to the abovementioned embodiment of the image processing method, and no further description is incorporated herein.

For example, other implementations of the image processing method implemented by the processor 901 by executing the program stored in the memory 903 are the same as the implementations mentioned in the foregoing embodiments of the image processing method, and no further description is incorporated herein.

For example, the communication bus 904 may be a peripheral component interconnection standard (PCI) bus or an extended industry standard architecture (EISA) bus. The communication bus can be classified into address bus, data bus, control bus, etc. For ease of illustration, the communication bus is only represented by a thick line in the drawing, but it does not mean that there is only one busbar or one type of busbar.

For example, the communication interface 902 is configured to implement communication between the electronic device and other devices.

For example, the processor 901 and the memory 903 may be provided on the server terminal (or the cloud).

For example, the processor 901 may control other components in the electronic device to perform desired functions. The processor 901 can be a central processing unit (CPU), a network processor (NP), etc., and can also be a digital signal processor (DSP), an application-specific integrated circuit (ASIC), a field programmable gate array (FPGA) or other programmable logic devices, discrete gates or transistor logic devices, discrete hardware components. The central processing unit (CPU) can be X86 or ARM architecture, etc.

For example, the memory 903 may include one or any combination of multiple computer program products, and the computer program products may include various forms of computer readable storage medium, such as volatile memory and/or non-volatile memory. Volatile memory may include, for example, random access memory (RAM) and/or cache memory (CACHE) and so on. Non-volatile memory may include, for example, read-only memory (ROM), hard disk, erasable programmable read-only memory (EPROM), portable compact disk read-only memory (CD-ROM), USB memory, flash drive, etc. One or more computer-readable instructions may be stored on the computer readable storage medium, and the processor 901 may run the computer-readable instructions to implement various functions of the electronic device. Various applications and various data can also be stored in the storage medium.

For example, for a detailed description of the process of performing image processing by the electronic device, reference may be made to the relevant description in the embodiment of the image processing method, and no further description is incorporated herein.

Figure 14:
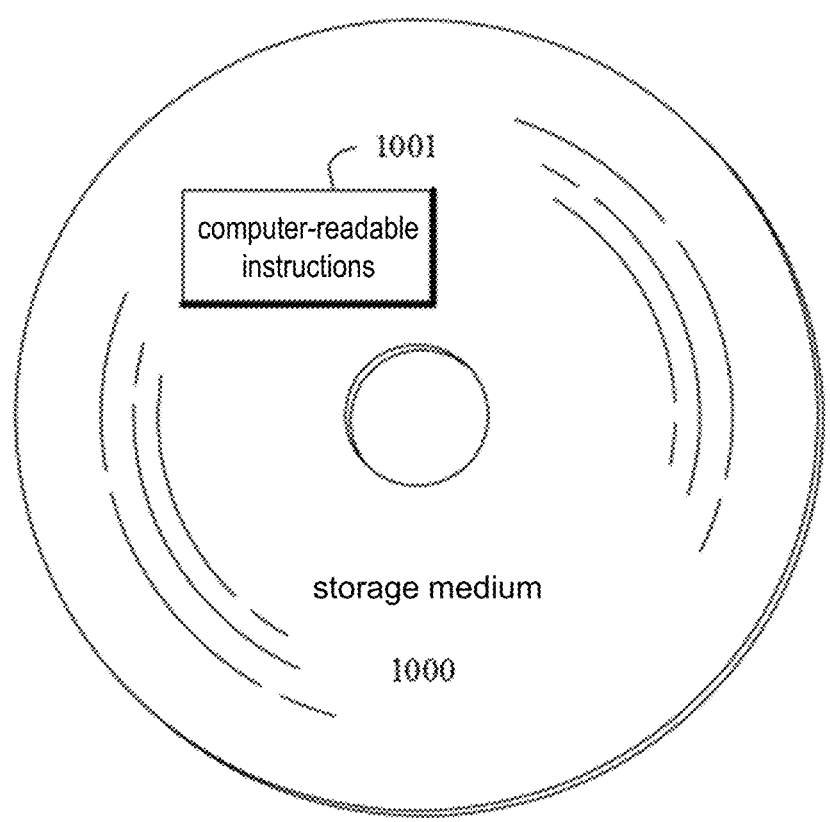
FIG. 14 is a schematic view of a non-transitory computer readable storage medium provided by at least one embodiment of the present disclosure.

FIG. 14 is a schematic view of a non-transitory computer readable storage medium provided by at least one embodiment of the present disclosure. For example, as shown in FIG. 14, one or more computer-readable instructions 1001 may be stored non-temporarily on the storage medium 1000. For example, when the computer-readable instructions 1001 are executed by a processor, one or more steps in the image processing method described above can be executed.

For example, the storage medium 1000 may be applied to the above-mentioned electronic device, for example, the storage medium 1000 may include the memory 903 in the electronic device.

For example, for the description of the storage medium 1000, please refer to the description of the memory in the embodiment of the electronic device, and no further description is incorporated herein.

For this disclosure, the following needs to be specified:

(1) The drawings of the embodiments of the present disclosure only refer to the structures related to the embodiments of the present disclosure, and other structures can refer to the common design.

(2) For clarity, in the drawings used to describe the embodiments of the present invention, the thickness and size of layers or structures are exaggerated. It can be understood that when an element such as a layer, film, region or substrate is referred to as being "on" or "under" another element, the element can be "directly" "on" or "under" another element, or an intermediate element may be located therebetween.

(3) As long as no conflict is generated, the embodiments of the present disclosure and the features in the embodiments can be combined with each other to obtain new embodiments.

The above are only specific implementations of the present disclosure, but the protection scope of the present disclosure is not limited thereto, and the protection scope of the present disclosure should be subject to the protection scope of the claims.

What is claimed is:

1. An image processing method, comprising:
obtaining an input image, wherein the input image comprises M character rows, and each of the M character rows comprises at least one character, the M character rows are arranged along a first direction, and M is a positive integer;
performing a global correction processing on the input image to obtain an intermediate corrected image;
performing a local adjustment on the intermediate corrected image to obtain a target corrected image,
wherein the step of performing the local adjustment on the intermediate corrected image to obtain the target corrected image comprises:
determining M character row lower boundaries corresponding to the M character rows according to the intermediate corrected image;
determining a local adjustment reference line, a first image boundary and a second image boundary of the intermediate corrected image based on the intermediate corrected image, wherein the first image boundary and the second image boundary are two boundaries of the intermediate corrected image in the first direction;
determining relative offsets of all pixels in the intermediate corrected image according to the first image boundary, the second image boundary, and the M character row lower boundaries;
setting local adjustment offsets of all pixels on the local adjustment reference line as a predetermined value;
determining local adjustment offsets of all pixels outside the local adjustment reference line in the intermediate corrected image according to the local adjustment offsets of all pixels on the local adjustment reference line and the relative offsets corresponding to all pixels in the intermediate corrected image;
performing the local adjustment on the intermediate corrected image to obtain the target corrected image according to the local adjustment offsets of all pixels outside the local adjustment reference line in the intermediate corrected image and the local adjustment offsets of all pixels on the local adjustment reference line;

wherein the intermediate corrected image further has a third image boundary, and the third image boundary is a boundary of the intermediate corrected image in a second direction perpendicular to the first direction, each character row lower boundary in the M character row lower boundaries comprises a reference pixel, wherein the reference pixel of each character row lower boundary is a pixel of each character row lower boundary closest to the third image boundary, the step of determining the relative offsets of all pixels in the intermediate corrected image according to the first image boundary, the second image boundary, and the M character row lower boundaries comprising:

determining relative offsets of all pixels on the M character row lower boundaries other than the reference pixels on the M character row lower boundaries according to a position of each of the pixels on the M character row lower boundaries;

determining the relative offsets of remaining pixels outside the M character row lower boundaries in the intermediate corrected image and the reference pixels on the M character row lower boundaries according to the relative offsets of all pixels on the M character row lower boundaries other than the reference pixels on the M character row lower boundaries, the first image boundary and the second image boundary, wherein the relative offsets of all pixels in the intermediate corrected image comprise the relative offset of each of the pixels on the M character row lower boundaries and the relative offset of the remaining pixels.

2. The image processing method according to claim 1, wherein the intermediate corrected image comprises pixels arranged in multiple rows and multiple columns, the step of determining the relative offsets of all pixels on the M character row lower boundaries other than the reference pixels on the M character row lower boundaries according to the position of each of the pixels on the M character row lower boundaries comprising:

for a t1-th character row lower boundary in the M character row lower boundaries, obtaining an a1-th pixel on the t1-th character row lower boundary, wherein the a1-th pixel is not the reference pixel on the t1-th character row lower boundary, and t1 is positive integer less than or equal to M, a1 is a positive integer less than or equal to a number of all pixels on the t1-th character row lower boundary;

in response to that a pixel column where the a1-th pixel is located is adjacent to a pixel column where the reference pixel on the t1-th character row lower boundary is located, determining a relative offset corresponding to the a1-th pixel according to a positional relationship between the reference pixel on the t1-th character row lower boundary and the a1-th pixel;

in response to that the pixel column where the a1-th pixel is located is not adjacent to the pixel column where the reference pixel on the t1-th character row lower boundary is located, obtaining an a2-th pixel on the t1-th character row lower boundary, and determining the relative offset corresponding to the a1-th pixel according to a positional relationship between the a1-th pixel and the a2-th pixel, wherein the a2-th pixel is not the reference pixel on the t1-th character row lower boundary, and the a2-th pixel is located on one side of the a1-th pixel close to the reference pixel on the t1-th character row lower boundary, and the pixel column where the a1-th pixel is located is adjacent to a pixel column where the a2-th pixel is located.

3. The image processing method according to claim 1, wherein the intermediate corrected image comprises pixels arranged in multiple rows and multiple columns, the M character row lower boundaries comprise a t2-th character row lower boundary, wherein t2 is a positive integer less than or equal to M, the step of determining the relative offsets of the remaining pixels outside the M character row lower boundaries in the intermediate corrected image and the reference pixels on the M character row lower boundaries according to the relative offset of all pixels on the M character row lower boundaries other than the reference pixels on the M character row lower boundaries, the first image boundary and the second image boundary comprising:

obtaining a first selected pixel located on the t2-th character row lower boundary and determining a first selected pixel column where the first selected pixel column is located, wherein the first selected pixel is extended along the first direction, and the first selected pixel is not the reference pixel on the t2-th character row lower boundary;

determining a first intersection pixel and a second intersection pixel corresponding to the first selected pixel on the first selected pixel column, wherein except for the first selected pixel, there is no other pixel which is on the character row lower boundary and is not the reference pixel on the character row lower boundary between the first intersection pixel and the second intersection pixel on the first selected pixel column;

in response to the first intersection pixel located on the first image boundary and the second intersection pixel located on the second image boundary, according to a distance between the first image boundary and the second image boundary, a distance between the first selected pixel and the first intersection pixel and a relative offset of the first selected pixel, determining a relative offset of the first intersection pixel, and according to the relative offset of the first selected pixel and the relative offset of the first intersection pixel, determining relative offsets of all pixels located between the first selected pixel and the first intersection pixel in the first selected pixel column;

according to a distance between the first image boundary and the second image boundary, a distance between the first selected pixel and the second intersection pixel and the relative offset of the first selected pixel, determining a relative offset of the second intersection pixel, and according to the relative offset of the first selected pixel and the relative amount of the second intersection pixel, determining the relative offsets of all pixels located between the first selected pixel and the second intersection pixel in the first selected pixel column;

in response to the first intersection pixel located on the first image boundary or the second image boundary and the second intersection pixel located on a certain character row lower boundary in the M character row lower boundaries, according to the distance between the first image boundary and the second image boundary, the distance between the first selected pixel and the first intersection pixel and the relative offset of the first selected pixel, determining the relative offset of the first intersection pixel;

according to the relative offset of the first selected pixel and the relative offset of the first intersection pixel, determining the relative offset of all pixels located between the first selected pixel and the first intersection pixel in the first selected pixel column;

according to the relative offset of the first selected pixel and the relative offset of the second intersection pixel, determining the relative offset of all pixels located between the first selected pixel and the second intersection pixel in the first selected pixel column;

in response to the first intersection pixel and the second intersection pixel respectively located on certain two character row lower boundaries in the M character row lower boundaries, according to the relative offset of the first selected pixel and the relative offset of the first intersection pixel, determining the relative offset of all pixels located between the first selected pixel and the first intersection pixel in the first selected pixel column, and according to the relative offset of the first selected pixel and the relative offset of the second intersection pixel, determining the relative offset of all pixels located between the first selected pixel and the second intersection pixel in the first selected pixel column.

4. The image processing method according to claim 3, wherein in the case where the first intersection pixel and the second intersection pixel are respectively located on the two character row lower boundaries in the M character row lower boundaries:

the step of determining the relative offsets of all pixels between the first selected pixel and the first intersection pixel in the first selected pixel column according to the relative offset of the first selected pixel and the relative offset of the first intersection pixel comprising:

performing a linear interpolation on the relative offset of the first selected pixel and the relative offset of the first intersection pixel, so as to obtain the relative offsets of all pixels located between the first selected pixel and the first intersection pixel in the first selected pixel column;

the step of determining the relative offsets of all pixels located between the first selected pixel and the second intersection pixel in the first selected pixel column according to the relative offset of the first selected pixel and the relative offset of the second intersection pixel comprising:

performing the linear interpolation on the relative offset of the first selected pixel and the relative offset of the second intersection pixel, so as to obtain the relative offsets of all pixels located between the first selected pixel and the second intersection pixel in the first selected pixel column.

5. The image processing method according to claim 3, wherein the step of determining the relative offset of the first intersection pixel according to the distance between the first image boundary and the second image boundary, the distance between the first selected pixel and the first intersection pixel, and the relative offset of the first selected pixel comprises:

in response to that the distance between the first image boundary and the second image boundary and the distance between the first selected pixel and the first intersection pixel satisfy a first relation, determining the relative offset of the first intersection pixel as the predetermined value;

in response to that the distance between the first image boundary and the second image boundary and the distance between the first selected pixel and the first intersection pixel satisfy a second relation, determining the relative offset of the first intersection pixel as the relative offset of the first selected pixel;

the step of determining the relative offset of the second intersection pixel according to the distance between the first image boundary and the second image boundary, the distance between the first selected pixel and the second intersection pixel, and the relative offset of the first selected pixel comprises:

in response to that the distance between the first image boundary and the second image boundary and the distance between the first selected pixel and the second intersection pixel satisfy a third relation, determining the relative offset of the second intersection pixel as the predetermined value;

in response to that the distance between the first image boundary and the second image boundary and the distance between the first selected pixel and the second intersection pixel satisfy a fourth relation, determining the relative offset of the second intersection pixel as the relative offset of the first selected pixel;

wherein the first relation is expressed as:

$h1 > H/DH$, the second relation is expressed as:

$h1 \leq H/DH$, the third relation is expressed as:

$h2 > H/DH$, the fourth relation is expressed as:

$h2 \leq H/DH$, in the relations, h1 is the distance between the first intersection pixel and the first selected pixel, h2 is the distance between the second intersection pixel and the first selected pixel, H is the distance between the first image boundary and the second image boundary, and DH is a constant.

6. The image processing method according to claim 5, wherein under the condition that the first intersection pixel is located on the first image boundary and the second intersection pixel is located on the second image boundary, or the first intersection pixel is located on the first image boundary or the second image boundary and the second intersection pixel is located on the certain character row lower boundary in the M character row lower boundaries, the step of determining the relative offsets of all pixels between the first selected pixel and the first intersection pixel in the first selected pixel column according to the relative offset of the first selected pixel and the relative offset of the first intersection pixel comprises:

in response to that the distance between the first image boundary and the second image boundary and the distance between the first intersection pixel and the first selected pixel satisfy the first relation, performing the linear interpolation on the relative offset of the first selected pixel and the relative offset of the first intersection pixel, so as to obtain the relative offset of all pixels between the first selected pixel and the first intersection pixel in the first selected pixel column;

in response to that the distance between the first image boundary and the second image boundary and the distance between the first intersection pixel and the first selected pixel satisfy the second relation, the relative offsets of all pixels located between the first selected pixel and the first intersection pixel in the first selected pixel column are determined as the relative offset of the first selected pixel;

under the condition that the first intersection pixel is located on the first image boundary and the second intersection pixel is located on the second image boundary, the step of determining the relative offsets of all pixels located between the first selected pixel and the second intersection pixel in the first selected pixel column according to the relative offset of the first selected pixel and the relative offset of the second intersection pixel comprises:

in response to that the distance between the first image boundary and the second image boundary and the distance between the second intersection pixel and the first selected pixel satisfy the third relation, performing the linear interpolation on the relative offset of the first selected pixel and the relative offset of the second intersection pixel, so as to obtain the relative offsets of all pixels between the first selected pixel and the second intersection pixel in the first selected pixel column;

in response to that the distance between the first image boundary and the second image boundary and the distance between the second intersection pixel and the first selected pixel satisfy the fourth relation, the relative offsets of all pixels between the first selected pixel and the second intersection pixel in the first selected pixel column are determined as the relative offset of the first selected pixel;

under the condition that the first intersection pixel is located on the first image boundary or the second image boundary and the second intersection pixel is located on the certain character row lower boundary in the M character row lower boundaries, the step of determining the relative offsets of all pixels located between the first selected pixel and the second intersection pixel in the first selected pixel column according to the relative offset of the first selected pixel and the relative offset of the second intersection pixel comprises:

performing the linear interpolation on the relative offset of the first selected pixel and the relative offset of the second intersection pixel to obtain the relative offsets of all pixels between the first selected pixel and the second intersection pixel in the first selected pixel column.

7. The image processing method according to claim 1, wherein the intermediate corrected image comprises pixels arranged in multiple rows and multiple columns, the step of determining the relative offsets of the remaining pixels outside the M character row lower boundaries in the intermediate corrected image and the reference pixels on the M character row lower boundaries according to the relative offsets of all pixels on the M character row lower boundaries other than the reference pixels on the M character row lower boundaries, the first image boundary and the second image boundary comprises:

obtaining a second selected pixel and determining a second selected pixel column where the second selected pixel is located, wherein the second selected pixel column extends along the first direction, and the second selected pixel is not located on the M character row lower boundaries or the second selected pixel is the reference pixel on a certain character row lower boundary in the M character row lower boundaries;

in response to that all pixels on the second selected pixel column do not intersect any character row lower boundary in the M character row lower boundaries, or in response to that there is an intersection pixel between the second selected pixel column and any character row lower boundary in the M character row lower boundaries, and the intersection pixel between the second selected pixel column and any character row lower boundary is the reference pixel on any character row lower boundary, the relative offsets of all pixels on the second selected pixel column are determined as the predetermined value.

8. The image processing method according to claim 1, wherein the intermediate corrected image comprises pixels arranged in multiple rows and multiple columns, the step of determining the local adjustment offsets of all pixels outside the local adjustment reference line in the intermediate corrected image according to the local adjustment offsets of all pixels on the local adjustment reference line and the relative offset corresponding to all pixels in the intermediate corrected image comprises:

obtaining a third selected pixel, wherein the third selected pixel is not located on the local adjustment reference line;

determining a pixel row where the third selected pixel is located, and obtaining a pixel adjacent to the third selected pixel on the pixel row and using the pixel as a reference pixel, wherein the reference pixel is located on one side of the third selected pixel close to the local adjustment reference line or on the local adjustment reference line;

determining a local adjustment offset of the reference pixel;

determining a local adjustment offset of the third selected pixel according to the local adjustment offset of the reference pixel and a relative offset of the third selected pixel.

9. The image processing method according to claim 8, wherein the step of determining the local adjustment offset of the third selected pixel according to the local adjustment offset of the reference pixel and the relative offset of the third selected pixel comprises:

in response to the third selected pixel being located on a first side of the local adjustment reference line, the local adjustment offset of the third selected pixel is expressed as:

$$dyt=dyc+ddyt,$$

in response to the third selected pixel being located on a second side of the local adjustment reference line, the local adjustment offset of the third selected pixel is expressed as:

$$dyt=dyc-ddyt,$$

wherein dyt is the local adjustment offset of the third selected pixel, dyc is the local adjustment offset of the reference pixel, and ddyt is the relative offset of the third selected pixel.

10. The image processing method according to claim 9, wherein the first side is a left side of the local adjustment reference line, and the second side is a right side of the local adjustment reference line.

11. The image processing method according to claim 1, wherein the step of determining the local adjustment reference line comprises:

taking a middle line of the intermediate corrected image extending along the first direction as the local adjustment reference line.

12. The image processing method according to claim 1, wherein the step of performing the global correction processing on the input image to obtain the intermediate corrected image comprises:

performing a binarization processing on the input image to obtain a binarized image;

performing a character connection processing on the binarized image to obtain an input character connected image, wherein the input character connected image comprises M input character connected areas corresponding to the M character rows;

obtaining M middle lines corresponding to the M input character connected areas one-to-one, wherein the M input character connected areas are arranged along the first direction;

setting W first division lines, wherein the W first division lines extend along the first direction;

obtaining multiple intersections between the M middle lines and the W first division lines as multiple third intersection pixels;

performing a quadratic fitting based on the multiple third intersection pixels to obtain W quadratic functions corresponding to the W first division lines one-to-one;

setting Q second division lines, wherein the Q second division lines extend along a second direction, wherein the first direction is perpendicular to the second direction;

obtaining multiple intersections between the W first division lines and the Q second division lines as multiple fourth intersection pixels;

calculating global adjustment offsets of the multiple fourth intersection pixels based on the W quadratic functions;

performing the global correction processing on the input image according to the global adjustment offsets of the multiple fourth intersection pixels, so as to obtain the intermediate corrected image.

13. The image processing method according to claim 12, wherein the step of performing the quadratic fitting based on the multiple third intersection pixels to obtain the W quadratic functions corresponding to the W first division lines one-to-one comprises:

determining a second coordinate system based on the input image, wherein the second coordinate system comprises an X-axis and a Y-axis, the first direction is parallel with the Y-axis, and the second direction is parallel with the X-axis;

determining coordinate values of multiple character center points corresponding to the multiple third intersection pixels in the second coordinate system;

calculating the global adjustment offsets of the multiple third intersection pixels based on the multiple character center points;

performing a quadratic fitting on the global adjustment offsets of the multiple third intersection pixels to obtain the W quadratic functions corresponding to the W first division lines one-to-one.

14. An image processing device, comprising:

an acquisition module configured to obtain an input image, wherein the input image comprises M character rows, and each of the M character rows comprises at least one character, the M character rows are arranged in a first direction, and M is a positive integer;

a global correction module, configured to perform a global correction processing on the input image to obtain an intermediate corrected image;

a local adjustment module configured to perform a local adjustment to the intermediate corrected image to obtain a target corrected image;

wherein the operation of performing local adjustment on the intermediate corrected image by the local adjustment module to obtain the target corrected image comprises the following operations:

determining a M character row lower boundaries corresponding to the M character rows according to the intermediate corrected image;

determining a local adjustment reference line, a first image boundary and a second image boundary of the intermediate corrected image based on the intermediate corrected image, wherein the first image boundary and the second image boundary are two boundaries of the intermediate corrected image in the first direction;

determining relative offsets of all pixels in the intermediate corrected image according to the first image boundary, the second image boundary, and the M character row lower boundaries;

setting local adjustment offsets of all pixels on the local adjustment reference line as a predetermined value;

determining local adjustment offsets of all pixels outside the local adjustment reference line in the intermediate corrected image according to the local adjustment offsets of all pixels on the local adjustment reference line and the relative offsets corresponding to all pixels in the intermediate corrected image;

performing the local adjustment on the intermediate corrected image to obtain the target corrected image according to the local adjustment offsets of all pixels outside the local adjustment reference line in the intermediate corrected image and the local adjustment offsets of all pixels on the local adjustment reference line;

wherein the intermediate corrected image has a third image boundary, and the third image boundary is a boundary of the intermediate corrected image in a second direction perpendicular to the first direction, each character row lower boundary in the M character row lower boundaries comprises a reference pixel, wherein the reference pixel of each of the character row lower boundary is a pixel of each character row lower boundary closest to the third image boundary, the operation of determining the relative offsets of all pixels in the intermediate corrected image according to the first image boundary, the second image boundary, and the M character row lower boundaries comprising:

determining relative offsets of all pixels on the M character row lower boundaries other than the reference pixels on the M character row lower boundaries according to a position of each of the pixels on the M character row lower boundaries;

determining the relative offsets of remaining pixels outside the M character row lower boundaries in the intermediate corrected image and the reference pixels on the M character row lower boundaries according to the relative offsets of all pixels on the M character row lower boundaries other than the reference pixels on the M character row lower boundaries, the first image boundary and the second image boundary, wherein the relative offsets of all pixels in the intermediate corrected image comprise the relative offset of each of the pixels on the M character row lower boundaries and the relative offset of the remaining pixels.

15. The image processing device according to claim 14, wherein the intermediate corrected image comprises pixels arranged in multiple rows and multiple columns, the operation of determining the relative offsets of all pixels on the M character row lower boundaries other than the reference pixels on the M character row lower boundaries according to the position of each of the pixels on the M character row lower boundaries comprising:

for a t1-th character row lower boundary in the M character row lower boundaries, obtaining an a1-th pixel on the t1-th character row lower boundary, wherein the a1-th pixel is not the reference pixel on the t1-th character row lower boundary, and t1 is positive integer less than or equal to M, a1 is a positive integer less than or equal to a number of all pixels on the t1-th character row lower boundary;

in response to that a pixel column where the a1-th pixel is located is adjacent to a pixel column where the reference pixel on the t1-th character row lower boundary is located, determining a relative offset corresponding to the a1-th pixel according to a positional relationship between the reference pixel on the t1-th character row lower boundary and the a1-th pixel;

in response to that the pixel column where the a1-th pixel is located is not adjacent to the pixel column where the reference pixel on the t1-th character row lower boundary is located, obtaining an a2-th pixel on the t1-th character row lower boundary, and determining the relative offset corresponding to the a1-th pixel according to a positional relationship between the a1-th pixel and the a2-th pixel, wherein the a2-th pixel is not the reference pixel on the t1-th character row lower boundary, and the a2-th pixel is located on one side of the a1-th pixel close to the reference pixel on the t1-th character row lower boundary, and the pixel column where the a1-th pixel is located is adjacent to a pixel column where the a2-th pixel is located.

16. The image processing device according to claim 14, wherein the intermediate corrected image comprises pixels arranged in multiple rows and multiple columns, the M character row lower boundaries comprise a t2-th character row lower boundary, wherein t2 is a positive integer less than or equal to M, the operation of determining the relative offsets of the remaining pixels outside the M character row lower boundaries in the intermediate corrected image and the reference pixels on the M character row lower boundaries according to the relative offset of all pixels on the M character row lower boundaries other than the reference pixels on the M character row lower boundaries, the first image boundary and the second image boundary comprising:

obtaining a first selected pixel located on the t2-th character row lower boundary and determining a first selected pixel column where the first selected pixel column is located, wherein the first selected pixel is extended along the first direction, and the first selected pixel is not the reference pixel on the t2-th character row lower boundary;

determining a first intersection pixel and a second intersection pixel corresponding to the first selected pixel on the first selected pixel column, wherein except for the first selected pixel, there is no other pixel which is on the character row lower boundary and is not the reference pixel on the character row lower boundary between the first intersection pixel and the second intersection pixel on the first selected pixel column;

in response to the first intersection pixel located on the first image boundary and the second intersection pixel located on the second image boundary, according to a distance between the first image boundary and the second image boundary, a distance between the first selected pixel and the first intersection pixel and a relative offset of the first selected pixel, determining a relative offset of the first intersection pixel, and according to the relative offset of the first selected pixel and the relative offset of the first intersection pixel, determining relative offsets of all pixels located between the first selected pixel and the first intersection pixel in the first selected pixel column;

according to a distance between the first image boundary and the second image boundary, a distance between the first selected pixel and the second intersection pixel and the relative offset of the first selected pixel, determining a relative offset of the second intersection pixel, and according to the relative offset of the first selected pixel and the relative amount of the second intersection pixel, determining the relative offsets of all pixels located between the first selected pixel and the second intersection pixel in the first selected pixel column;

in response to the first intersection pixel located on the first image boundary or the second image boundary and the second intersection pixel located on a certain character row lower boundary in the M character row lower boundaries, according to the distance between the first image boundary and the second image boundary, the distance between the first selected pixel and the first intersection pixel and the relative offset of the first selected pixel, determining the relative offset of the first intersection pixel;

according to the relative offset of the first selected pixel and the relative offset of the first intersection pixel, determining the relative offset of all pixels located between the first selected pixel and the first intersection pixel in the first selected pixel column;

according to the relative offset of the first selected pixel and the relative offset of the second intersection pixel, determining the relative offset of all pixels located between the first selected pixel and the second intersection pixel in the first selected pixel column;

in response to the first intersection pixel and the second intersection pixel respectively located on certain two character row lower boundaries in the M character row lower boundaries, according to the relative offset of the first selected pixel and the relative offset of the first intersection pixel, determining the relative offset of all pixels located between the first selected pixel and the first intersection pixel in the first selected pixel column, and according to the relative offset of the first selected pixel and the relative offset of the second intersection pixel, determining the relative offset of all pixels located between the first selected pixel and the second intersection pixel in the first selected pixel column.

17. The image processing device according to claim 16, wherein in the case where the first intersection pixel and the second intersection pixel are respectively located on the two character row lower boundaries in the M character row lower boundaries:

the operation of determining the relative offsets of all pixels between the first selected pixel and the first intersection pixel in the first selected pixel column by the local adjustment module according to the relative offset of the first selected pixel and the relative offset of the first intersection pixel comprising:
performing a linear interpolation on the relative offset of the first selected pixel and the relative offset of the first intersection pixel, so as to obtain the relative offsets of all pixels located between the first selected pixel and the first intersection pixel in the first selected pixel column;
the operation of determining the relative offsets of all pixels located between the first selected pixel and the second intersection pixel in the first selected pixel column by the local adjustment module according to the relative offset of the first selected pixel and the relative offset of the second intersection pixel comprising:
performing the linear interpolation on the relative offset of the first selected pixel and the relative offset of the second intersection pixel, so as to obtain the relative offsets of all pixels located between the first selected pixel and the second intersection pixel in the first selected pixel column.

18. The image processing device according to claim 16, wherein the operation of determining the relative offset of the first intersection pixel by the local adjustment module according to the distance between the first image boundary and the second image boundary, the distance between the first selected pixel and the first intersection pixel, and the relative offset of the first selected pixel comprises:
in response to that the distance between the first image boundary and the second image boundary and the distance between the first selected pixel and the first intersection pixel satisfy a first relation, determining the relative offset of the first intersection pixel as the predetermined value;
in response to that the distance between the first image boundary and the second image boundary and the distance between the first selected pixel and the first intersection pixel satisfy a second relation, determining the relative offset of the first intersection pixel as the relative offset of the first selected pixel;
the operation of determining the relative offset of the second intersection pixel by the local adjustment module according to the distance between the first image boundary and the second image boundary, the distance between the first selected pixel and the second intersection pixel, and the relative offset of the first selected pixel comprises:
in response to that the distance between the first image boundary and the second image boundary and the distance between the first selected pixel and the second intersection pixel satisfy a third relation, determining the relative offset of the second intersection pixel as the predetermined value;
in response to that the distance between the first image boundary and the second image boundary and the distance between the first selected pixel and the second intersection pixel satisfy a fourth relation, determining the relative offset of the second intersection pixel as the relative offset of the first selected pixel;
wherein the first relation is expressed as:

$h1 > H/DH$, the second relation is expressed as:

$h1 \leq H/DH$, the third relation is expressed as:

$h2 > H/DH$, the fourth relation is expressed as:

$h2 \leq H/DH$, in the relations, h1 is the distance between the first intersection pixel and the first selected pixel, h2 is the distance between the second intersection pixel and the first selected pixel, H is the distance between the first image boundary and the second image boundary, and DH is a constant.

19. The image processing device according to claim 18, wherein under the condition that the first intersection pixel is located on the first image boundary and the second intersection pixel is located on the second image boundary, or the first intersection pixel is located on the first image boundary or the second image boundary and the second intersection pixel is located on the certain character row lower boundary in the M character row lower boundaries, the operation of determining the relative offsets of all pixels between the first selected pixel and the first intersection pixel in the first selected pixel column by the local adjustment module according to the relative offset of the first selected pixel and the relative offset of the first intersection pixel comprises:
in response to that the distance between the first image boundary and the second image boundary and the distance between the first intersection pixel and the first selected pixel satisfy the first relation, performing the linear interpolation on the relative offset of the first selected pixel and the relative offset of the first intersection pixel, so as to obtain the relative offset of all pixels between the first selected pixel and the first intersection pixel in the first selected pixel column;
in response to that the distance between the first image boundary and the second image boundary and the distance between the first intersection pixel and the first selected pixel satisfy the second relation, the relative offsets of all pixels located between the first selected pixel and the first intersection pixel in the first selected pixel column are determined as the relative offset of the first selected pixel;
under the condition that the first intersection pixel is located on the first image boundary and the second intersection pixel is located on the second image boundary, the operation of determining the relative offsets of all pixels located between the first selected pixel and the second intersection pixel in the first selected pixel column by the local adjustment module according to the relative offset of the first selected pixel and the relative offset of the second intersection pixel comprises:
in response to that the distance between the first image boundary and the second image boundary and the distance between the second intersection pixel and the first selected pixel satisfy the third relation, performing the linear interpolation on the relative offset of the first selected pixel and the relative offset of the second intersection pixel, so as to obtain the relative offsets of all pixels between the first selected pixel and the second intersection pixel in the first selected pixel column;
in response to that the distance between the first image boundary and the second image boundary and the distance between the second intersection pixel and the first selected pixel satisfy the fourth relation, the relative offsets of all pixels between the first selected pixel and the second intersection pixel in the first selected pixel column are determined as the relative offset of the first selected pixel;

under the condition that the first intersection pixel is located on the first image boundary or the second image boundary and the second intersection pixel is located on the certain character row lower boundary in the M character row lower boundaries, the operation of determining the relative offsets of all pixels located between the first selected pixel and the second intersection pixel in the first selected pixel column by the local adjustment module according to the relative offset of the first selected pixel and the relative offset of the second intersection pixel comprises:

performing the linear interpolation on the relative offset of the first selected pixel and the relative offset of the second intersection pixel to obtain the relative offsets of all pixels between the first selected pixel and the second intersection pixel in the first selected pixel column.

20. The image processing device according to claim 14, wherein the intermediate corrected image comprises pixels arranged in multiple rows and multiple columns, the operation of determining the relative offsets of the remaining pixels outside the M character row lower boundaries in the intermediate corrected image and the reference pixels on the M character row lower boundaries by the local adjustment module according to the relative offsets of all pixels on the M character row lower boundaries other than the reference pixels on the M character row lower boundaries, the first image boundary and the second image boundary comprises:

obtaining a second selected pixel and determining a second selected pixel column where the second selected pixel is located, wherein the second selected pixel column extends along the first direction, and the second selected pixel is not located on the M character row lower boundaries or the second selected pixel is the reference pixel on a certain character row lower boundary in the M character row lower boundaries;

in response to that all pixels on the second selected pixel column do not intersect any character row lower boundary in the M character row lower boundaries, or in response to that there is an intersection pixel between the second selected pixel column and any character row lower boundary in the M character row lower boundaries, and the intersection pixel between the second selected pixel column and any character row lower boundary is the reference pixel on any character row lower boundary, the relative offsets of all pixels on the second selected pixel column are determined as the predetermined value.

21. The image processing device according to claim 14, wherein the intermediate corrected image comprises pixels arranged in multiple rows and multiple columns, the operation of determining the local adjustment offsets of all pixels outside the local adjustment reference line in the intermediate corrected image by the local adjustment module according to the local adjustment offsets of all pixels on the local adjustment reference line and the relative offset corresponding to all pixels in the intermediate corrected image comprises:

obtaining a third selected pixel, wherein the third selected pixel is not located on the local adjustment reference line;

determining a pixel row where the third selected pixel is located, and obtaining a pixel adjacent to the third selected pixel on the pixel row and using the pixel as the reference pixel, wherein the reference pixel is located on one side of the third selected pixel close to the local adjustment reference line or on the local adjustment reference line;

determining a local adjustment offset of the reference pixel;

determining a local adjustment offset of the third selected pixel according to the local adjustment offset of the reference pixel and a relative offset of the third selected pixel.

22. The image processing device according to claim 21, wherein the operation of determining the local adjustment offset of the third selected pixel by the local adjustment module according to the local adjustment offset of the reference pixel and the relative offset of the third selected pixel comprises:

in response to the third selected pixel being located on a first side of the local adjustment reference line, the local adjustment offset of the third selected pixel is expressed as:

$$dyt=dyc+ddyt,$$

in response to the third selected pixel being located on a second side of the local adjustment reference line, the local adjustment offset of the third selected pixel is expressed as:

$$dyt=dyc-ddyt,$$

wherein dyt is the local adjustment offset of the third selected pixel, dyc is the local adjustment offset of the reference pixel, and ddyt is the relative offset of the third selected pixel.

23. The image processing device according to claim 14, wherein the operation of performing the global correction processing on the input image by the global correction module to obtain the intermediate corrected image comprises:

performing a binarization processing on the input image to obtain a binarized image;

performing a character connection processing on the binarized image to obtain an input character connected image, wherein the input character connected image comprises M input character connected areas corresponding to the M character rows;

obtaining M middle lines corresponding to the M input character connected areas one-to-one, wherein the M input character connected areas are arranged along the first direction;

setting W first division lines, wherein the W first division lines extend along the first direction;

obtaining multiple intersections between the M middle lines and the W first division lines as multiple third intersection pixels;

performing a quadratic fitting based on the multiple third intersection pixels to obtain W quadratic functions corresponding to the W first division lines one-to-one;

setting Q second division lines, wherein the Q second division lines extend along a second direction, wherein the first direction is perpendicular to the second direction;

obtaining multiple intersections between the W first division lines and the Q second division lines as multiple fourth intersection pixels;

calculating global adjustment offsets of the multiple fourth intersection pixels based on the W quadratic functions;

performing the global correction processing on the input image according to the global adjustment offsets of the multiple fourth intersection pixels, so as to obtain the intermediate corrected image.

24. An electronic device, comprising:
- a memory, configured to store computer-readable instructions non-temporarily; and
- a processor, configured to execute the computer-readable instructions, wherein the image processing method as claimed in claim 1 is implemented when the computer-readable instructions are executed by the processor.

25. A non-transitory computer readable storage medium, wherein the non-transitory computer readable storage medium stores computer-readable instructions, wherein the image processing method as claimed in claim 1 is implemented when the computer-readable instructions are executed by a processor.

* * * * *